(12) United States Patent
Baran et al.

(10) Patent No.: US 12,244,798 B2
(45) Date of Patent: Mar. 4, 2025

(54) METHODS AND APPARATUS TO PERFORM DIRTY REGION READS AND WRITES TO REDUCE MEMORY BANDWIDTH USAGE

(71) Applicant: Intel Corporation, Santa Clara, CA (US)

(72) Inventors: Stanley Baran, Chandler, AZ (US); Satish Kumar Bhrugumalla, Fremont, CA (US); Kristoffer Fleming, Chandler, AZ (US); Charu Srivastava, Danville, CA (US); James Holland, Folsom, CA (US); Jong Dae Oh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 17/448,744

(22) Filed: Sep. 24, 2021

(65) Prior Publication Data

US 2022/0014740 A1    Jan. 13, 2022

(51) Int. Cl.
*H04N 11/02*        (2006.01)
*G06T 5/70*         (2024.01)
(Continued)

(52) U.S. Cl.
CPC ............. *H04N 19/119* (2014.11); *G06T 5/70* (2024.01); *G06T 7/194* (2017.01); *H04N 19/139* (2014.11);
(Continued)

(58) Field of Classification Search
CPC ............... H04N 19/119; H04N 19/139; H04N 19/176; G06T 7/194; G06T 5/70; G06T 2207/10016
(Continued)

(56) References Cited

U.S. PATENT DOCUMENTS

2004/0201753 A1* 10/2004 Kondo ...................... G06T 7/20
                                                    348/239
2005/0259870 A1* 11/2005 Kondo ...................... G06T 5/73
                                                    382/173
(Continued)

OTHER PUBLICATIONS

Microsoft, "Flip model, dirty rectangles, scrolled areas," Article, Nov. 18, 2022, 11 pages.

*Primary Examiner* — Jayanti K Patel
*Assistant Examiner* — Richard B Carter
(74) *Attorney, Agent, or Firm* — Hanley, Flight & Zimmerman, LLC

(57) ABSTRACT

An example apparatus includes image processing circuitry to determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame, and encoder circuitry to generate an updated frame portion by encoding the second foreground region and dirty blocks of the background image corresponding to the uncovered region without encoding static blocks of the background image, the static blocks not corresponding to the uncovered region, and store the updated frame portion in the at least one memory.

21 Claims, 15 Drawing Sheets

(51) Int. Cl.
*G06T 7/194* (2017.01)
*H04N 19/119* (2014.01)
*H04N 19/139* (2014.01)
*H04N 19/176* (2014.01)

(52) U.S. Cl.
CPC .. *H04N 19/176* (2014.11); *G06T 2207/10016* (2013.01)

(58) Field of Classification Search
USPC .............. 375/240.16, E7.123; 348/239, 699; 382/157, 173
See application file for complete search history.

(56) References Cited

U.S. PATENT DOCUMENTS

| | | | |
|---|---|---|---|
| 2009/0147851 A1* | 6/2009 | Klein Gunnewiek | ....................... H04N 19/573 375/E7.123 |
| 2015/0296102 A1* | 10/2015 | Fang | ....................... H04N 5/145 348/699 |
| 2017/0139573 A1* | 5/2017 | Li | ........................... G06T 11/60 |
| 2023/0267620 A1* | 8/2023 | Sanderson | ................ G06T 7/11 382/157 |

* cited by examiner

US 12,244,798 B2

1

METHODS AND APPARATUS TO PERFORM DIRTY REGION READS AND WRITES TO REDUCE MEMORY BANDWIDTH USAGE

FIELD OF THE DISCLOSURE

This disclosure relates generally to electronic user devices and, more particularly, to methods and apparatus to perform dirty region reads and writes to reduce memory bandwidth usage.

BACKGROUND

An electronic user device such as a laptop or a mobile device includes a camera to capture images. The camera can be used during a video call in which images of the user of the device are transmitted to other user devices.

Figure 1:
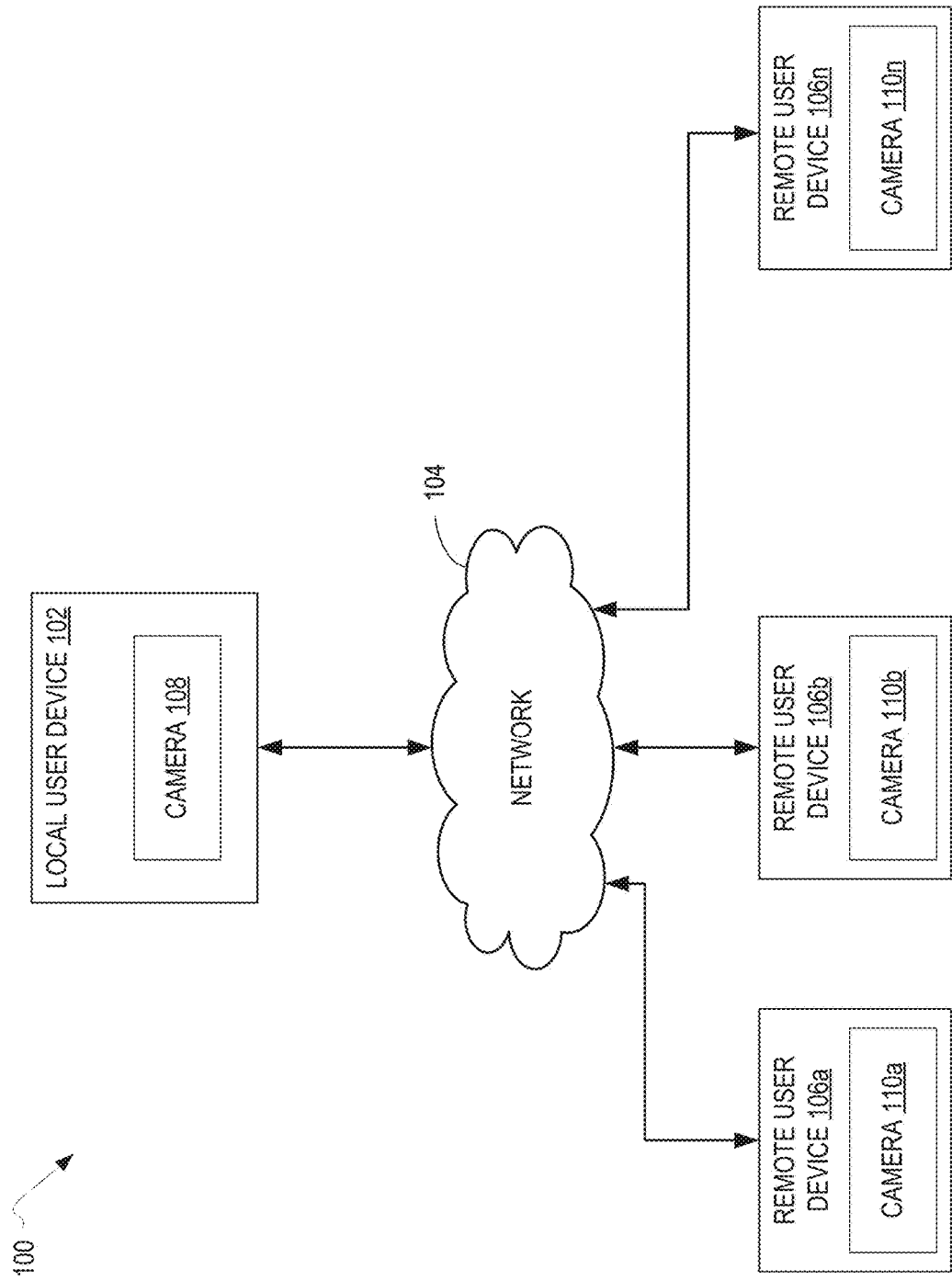
FIG. 1 illustrates a block diagram of example user devices connected via a network.

The figures are not to scale. Instead, the thickness of the layers or regions may be enlarged in the drawings. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device such as a laptop, tablet, or smartphone includes a camera. The user device may include user applications such as a video conferencing application installed thereon. During, for instance, a video conference, the camera (e.g., a built-in video camera, a separate camera that is an accessory to the input device, etc.) of the user device generates images of the user. The user device encodes and transmits the images to one or more video conferencing devices (e.g., laptops, tablets, smartphones, etc.) participating in the video conference. Each of the one or more video conferencing devices also includes a camera. During the video conference, the cameras of the one or more video conferencing devices generate images of respective users of the video conferencing devices. The one or more video conferencing devices encode and transmit the images to the user device. The user device decodes and displays the images received from the video conferencing output device(s) on a display screen of the user device.

Encoding the image generated by the camera of the user device can use a large amount of processing power of the user device. In some examples, a significant portion of the processing power is related to memory bandwidth usage which employs power-consuming memory resources such as double data rate input/output (DDRIO) and memory controller power. For example, in known video conferencing encoding pipelines, an entire video frame (e.g., a 1080p resolution image) may be read to and/or written from the memory several (e.g., seven or more) times. In some examples, video conferencing applications use a high frame rate (e.g., 30 frames per second). As a result, the video conferencing application can use a significant portion (e.g., 15 percent) of the power consumption of the user device for processing images generated by the camera.

Additionally, decoding the images received from the video conferencing devices at the user device can use a large amount of processing power of the user device related to memory bandwidth. For example, in known video conferencing decoding and display pipelines, an entire video frame (e.g., a 720p resolution image) may be read from and/or written to the memory several (e.g., four or more) times. In some examples, a video conference can include a plurality (e.g., 10) of participants such that the user device receives images from a plurality of (e.g., 9) of video conferencing devices. Therefore, the number of reads from and/or writes to the memory or entire video frames is multiplied by the number of additional participants (e.g., the number of video conferencing devices). Additionally, with the high frame rate (e.g., 30 frames per second) used for video conferencing, the video conferencing application can use a significant portion (e.g., 15 percent) of the power consumption of the user device for the decoding and display pipeline. In total, the video conferencing application can use a significant portion (e.g., 30 percent) of the power consumption of the user device for combined encoding and decoding pipelines.

In some examples, a first portion of the image generated by the camera of the user device or the camera(s) of the video conferencing devices(s) includes relevant information such as a depiction of the user and a second portion of the image includes less relevant information such as a depiction of a background portion of the image that is substantially unchanged from a previous frame. Examples disclosed herein reduce memory bandwidth usage during video conferencing by omitting and/or reducing the frequency of reading and/or writing the second portion of the image. Examples disclosed herein reduce memory bandwidth usage when a user device is processing (e.g., encoding) an image captured by a camera of the user device during video conferencing. Additionally, examples disclosed herein reduce memory bandwidth when a user device is decoding and displaying images received from other user devices during video conferencing.

FIG. 1 illustrates an example system 100 including connected user devices that can implement examples disclosed herein. In the example of FIG. 1, an example local user device 102 (e.g., a laptop computer, a smartphone, a desktop computer, an electronic tablet, a hybrid or convertible computer, etc.) is connected via a network 104 to a plurality of remote user devices 106a,b,n (e.g., laptops, smartphones, etc. associated with other participants of the video conference). The example local user device 102 includes a camera 108. During, for example, a video conference, the camera 108 can generate images associated with the example local user device 102 such as images including a user (not shown) of the example local user device 102. The example local user device 102 can process (e.g., perform image processing, encoding, etc.) the image and transmit the image via the network 104 to the remote user devices 106a,b,n. As explained above, processing the image can use a significant portion (e.g., 15 percent) of the power consumption of the local user device 102.

Additionally, each of the example remote user devices 106a,b,n includes a camera 110a,b,n. Each of the cameras 110a,b,n can generate images associated with the respective remote user device 106. For example, the camera 110a can capture an image of a user (not shown) of the remote user device 106a. Subsequently, each of the example remote user devices 106a,b,n can process (e.g., perform image processing, encoding, etc.) and transmit the images captured by the respective cameras 110a,b,n to the local user device 102 via the network 104. As such, the example local user device 102 receives the plurality of images from the remote user devices 106a,b,n. During video conferencing, the example local user device 102 processes (e.g., decodes, combines, displays, etc.) and displays the plurality of images. As explained above, processing the plurality of images received from the remote user devices 106a,b,n can use a significant (e.g., 15 percent) of the power consumption of the local user device 102.

Figure 2:
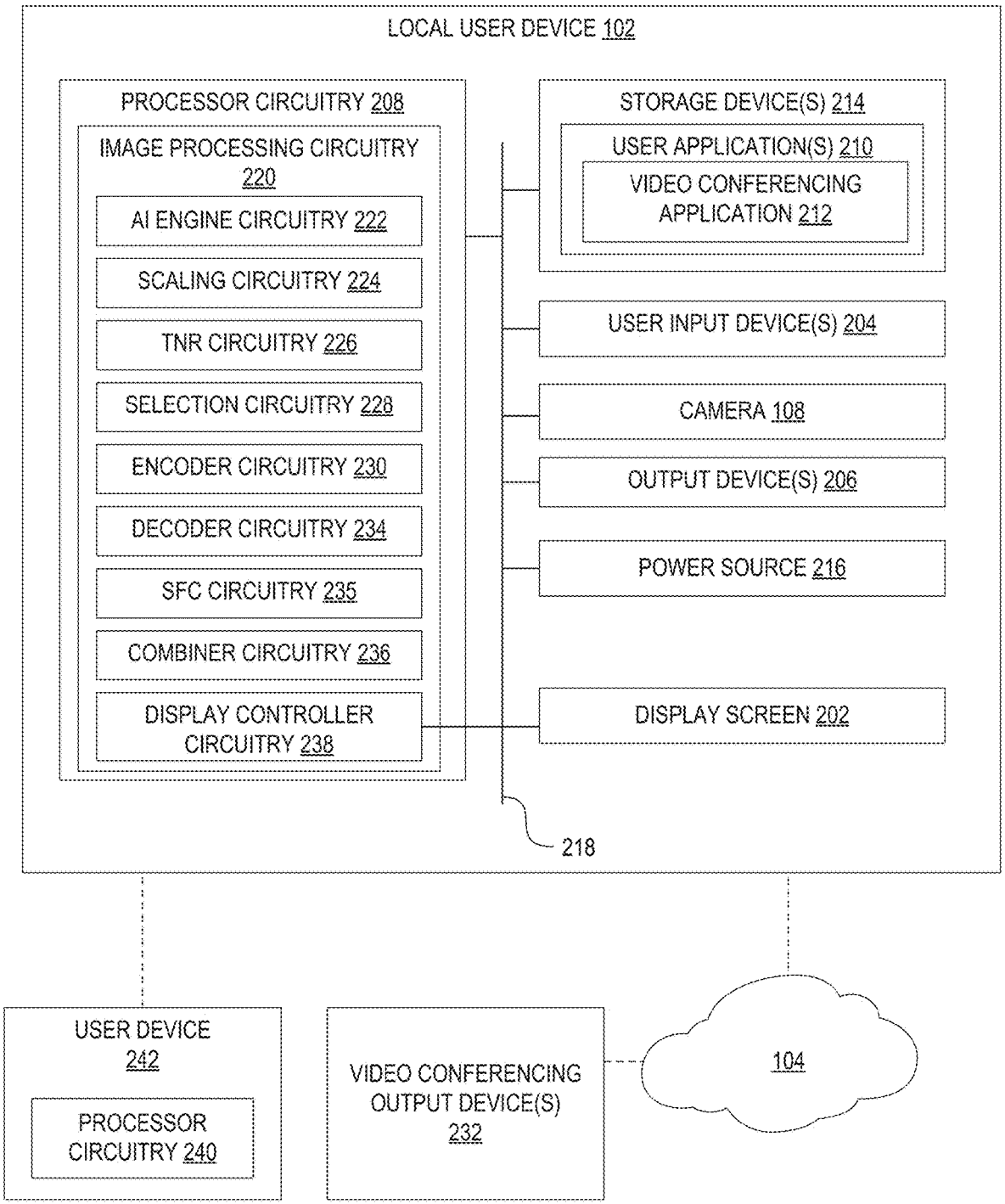
FIG. 2 illustrates an example system constructed in accordance with the teachings of this disclosure including a user device including image processing circuitry.

FIG. 2 illustrates the example local user device 102 constructed in accordance with teachings of this disclosure for processing images associated with a video conference on a user device. As discussed in connection with FIG. 1, the local user device 102 can be a personal computing device such as a laptop, a desktop computer, an electronic tablet, a smartphone, etc. Although FIG. 2 shows details of the example local user device 102, remote user devices 106a,b,n are substantially similar or identical to the local user device 102.

The example local user device 102 includes a display screen 202. In some examples, the display screen 202 is a touch screen that enables a user to interact with data presented on the display screen 202 by touching the display screen 202 with a stylus and/or one or more fingers or a hand of the user. Additionally or alternatively, the user can interact with data presented on the display screen 202 via user input device(s) 204 such as microphone(s), a keyboard, a mouse, a touch pad, etc. The example local user device 102 includes one or more output device(s) 206 such as speaker(s) to provide audible outputs to the user of the local user device 102.

The example local user device 102 of FIG. 2 includes processor circuitry 208. The processor circuitry 208 of the example local user device 102 is a semiconductor-based hardware logic device. The hardware processor circuitry 208 may implement a central processing unit (CPU) of the local user device 102, may include any number of cores, and may be implemented, for example, by a processor commercially available from Intel® Corporation. The processor circuitry 208 executes machine readable instructions (e.g., software) including, for example, user application(s) 210 such as a video conferencing application 212 installed on the local user device 102. The user application(s) 210 are stored in one or more storage devices 214 such as non-volatile memory (e.g., flash memory). The example local user device 102 of FIG. 2 includes a power source 216 such as a battery and/or transformer and AC/DC converter to provide power to the processor circuitry 208 and/or other components of the local user device 102 communicatively coupled via a bus 218.

The example local user device 102 of FIG. 2 includes the camera 108. As disclosed in connection with FIG. 1, the camera 108 generates image data including image captures of at least a portion of one or more users of the local user device 102. In the example of FIG. 2, image(s) generated by the camera 108 of the local user device 102 (e.g., during use of the video conferencing application 212) is processed by image processing circuitry 220. The example image processing circuitry 220 of FIG. 2 includes artificial intelligence (AI) engine circuitry 222. The example AI engine circuitry 222 can analyze the image depicting the user of the local user device 102 to determine a segmentation mask. For example, the segmentation mask can indicate an area of the image corresponding to a foreground region (e.g., including the user). In some examples, the segmentation mask has a resolution that is different (e.g., a different pixel width and/or height) than the resolution of the image generated by the camera 108. The example image processing circuitry 220 of FIG. 2 includes scaling circuitry 224. The example scaling circuitry 224 can adjust the resolution of the segmentation mask. For example, the scaling circuitry 224 can adjust the resolution of the segmentation mask such that it is the same as the resolution of the image generated by the camera 108.

The example image processing circuitry 220 of FIG. 2 includes temporal noise reduction (TNR) circuitry 226. The example TNR circuitry 226 can perform TNR on the image generated by the camera 108. In some examples, the TNR circuitry 226 performs TNR on only a portion of the image generated by the camera 108. In some examples, the portion of the image generated by the camera 108 on which TNR is performed is determined using the segmentation mask generated by the AI engine circuitry 222. The example image processing circuitry 220 of FIG. 2 includes selection circuitry 228. The example selection circuitry 228 can determine an uncovered portion of a background image. For example, the selection circuitry 228 can use the segmentation mask generated by the AI engine circuitry 222 and a segmentation mask generated by the AI engine circuitry 222 at a previous time step to determine a portion of the background image uncovered in the current time step. In other words, the foreground region of the image can move within the image from the previous time step to the current time step. As a result, a portion of the background image that was covered in the previous time step is uncovered in the current time step. The example selection circuitry 228 determines this uncovered portion and reads the uncovered portion of the background image from the storage device(s) 214.

The example image processing circuitry 220 of FIG. 2 includes encoder circuitry 230. The example encoder circuitry 230 can encode image(s) within the local user device 102. For example, the encoder circuitry 230 can encode the image generated by the camera 108. In some examples, the encoder circuitry 230 encodes only a portion of the image. For example, the encoder circuitry 230 can encode the portion of the image generated by the camera 108 that was processed by the TNR circuitry 226 and the uncovered portion of the background image read by the selection circuitry 228. The example encoder circuitry 230 can use encoding standards such as H.264 advanced video coding (AVC). In other examples, other encoding standards can be used by the encoder circuitry 230.

In the example of FIG. 2, the encoded image depicting (e.g., including a visual representation of) the user of the local user device 102 is transmitted to one or more video conferencing output device(s) 232 (e.g., the remote user devices 106 of FIG. 1). The image may be transmitted to the video conferencing output device(s) 232 via one or more protocol(s) (e.g., voice-over-internet protocol(s)) associated with the video conferencing application 212. In the example of FIG. 2, the encoded image is transmitted to the video conferencing output device(s) 232 via the network 104. Additionally, the video conferencing output device(s) 232 can transmit image(s) including respective users of the video conferencing output devices(s) 232 via one or more protocols(s) to the local user device 102. In the example of FIG. 2, the video conferencing output device(s) 232 transmit image(s) to the local user device 102 via the network 104. The example local user device 102 receives the image(s) from the video conferencing output device(s) 232 and stores the image(s) in the storage device(s) 214.

The example image processing circuitry 220 of FIG. 2 includes decoder circuitry 234. The example decoder circuitry 234 can decode the image(s) received from the video conferencing output device(s) 232. For example, the decoder circuitry 234 can use decoding standards such as H.264 advanced video coding (AVC). In other examples, other decoding standards can be used by the decoder circuitry 234. In some examples, the decoder circuitry 234 can decode only a portion of each of the image(s). For example, the decoder circuitry 234 can determine (e.g., via motion vectors and skip blocks) that a portion of the image is substantially unchanged from a previous image. The example decoder circuitry 234 can then decode only the portion of the image that is changed from the previous image. The example decoder circuitry 234 can subsequently write the decoded image(s) and/or the decoded portion of the image(s) to the storage device(s) 214.

The example image processing circuitry 220 of FIG. 2 includes scaler and format converter (SFC) circuitry 235. The example SFC circuitry 235 can scale and/or convert a format of the image(s) decoded by the decoder circuitry 234. Additionally, the example SFC circuitry 235 facilitates transfer of the image(s) out of the decoder circuitry 234. For example, the example SFC circuitry includes an internal storage buffer. The internal storage buffer of the example SFC circuitry 235 is directly connected to the decoder circuitry 234. Therefore, the internal storage buffer of the SFC circuitry 235 can receive image(s) from the decoder circuitry 234 directly (e.g., without reading and writing from the storage device(s) 214). The example image processing circuitry 220 of FIG. 2 includes combiner circuitry 236. The example combiner circuitry 236 receives the decoded image(s) from the SFC circuitry 235. Additionally, the example combiner circuitry 236 can write the decoded image(s) to the storage device(s) 214. For example, the decoder circuitry 234 writes the decoded image(s) into a grid view buffer. In some examples, the combiner circuitry 236 can write only the changed portions of the decoded images to the grid view buffer. In some examples, the combiner circuitry 236 includes metadata in the grid view buffer to indicate the changed portions of the image(s). The example image processing circuitry 220 of FIG. 2 includes display controller circuitry 238. The example display controller circuitry 238 generates a display composition and updates the display screen 202 with the display composition. The display composition includes the decoded image(s) from the grid view and user interface components from the video conferencing application 212. In some examples, the display composition included the metadata from the grid view buffer indicating the changed portions of the image(s). The example display controller circuitry 238 updates the display screen 202 with the display composition in order to display the decoded image(s). In some examples, the display controller circuitry 238 reads the metadata included in the display composition to determine the changed portions of the display composition. In these examples, the display controller circuitry 238 can selectively update the display screen 202 with only the changed portions.

In the example of FIG. 2, the image processing circuitry 220 is implemented by executable instructions executed on the processor circuitry 208 of the local user device 102. However, in other examples, the image processing circuitry 220 is implemented by processor circuitry 240 of another user device 242 (e.g., a smartphone, an edge device, a wearable device, etc.) in communication with the local user device 102 (e.g., via wired or wireless communication protocols), processor circuitry of the video conferencing output devices(s) 232, and/or by a cloud-based device 104 (e.g., one or more server(s), processor(s), and/or virtual machine(s)). In other examples, the image processing circuitry 220 is implemented by dedicated circuitry located on the local user device 102, the user device 242, and/or the video conferencing output device(s) 232. These components may be implemented in software, hardware, or in any combination of two or more of software, firmware, and/or hardware.

Figure 3:
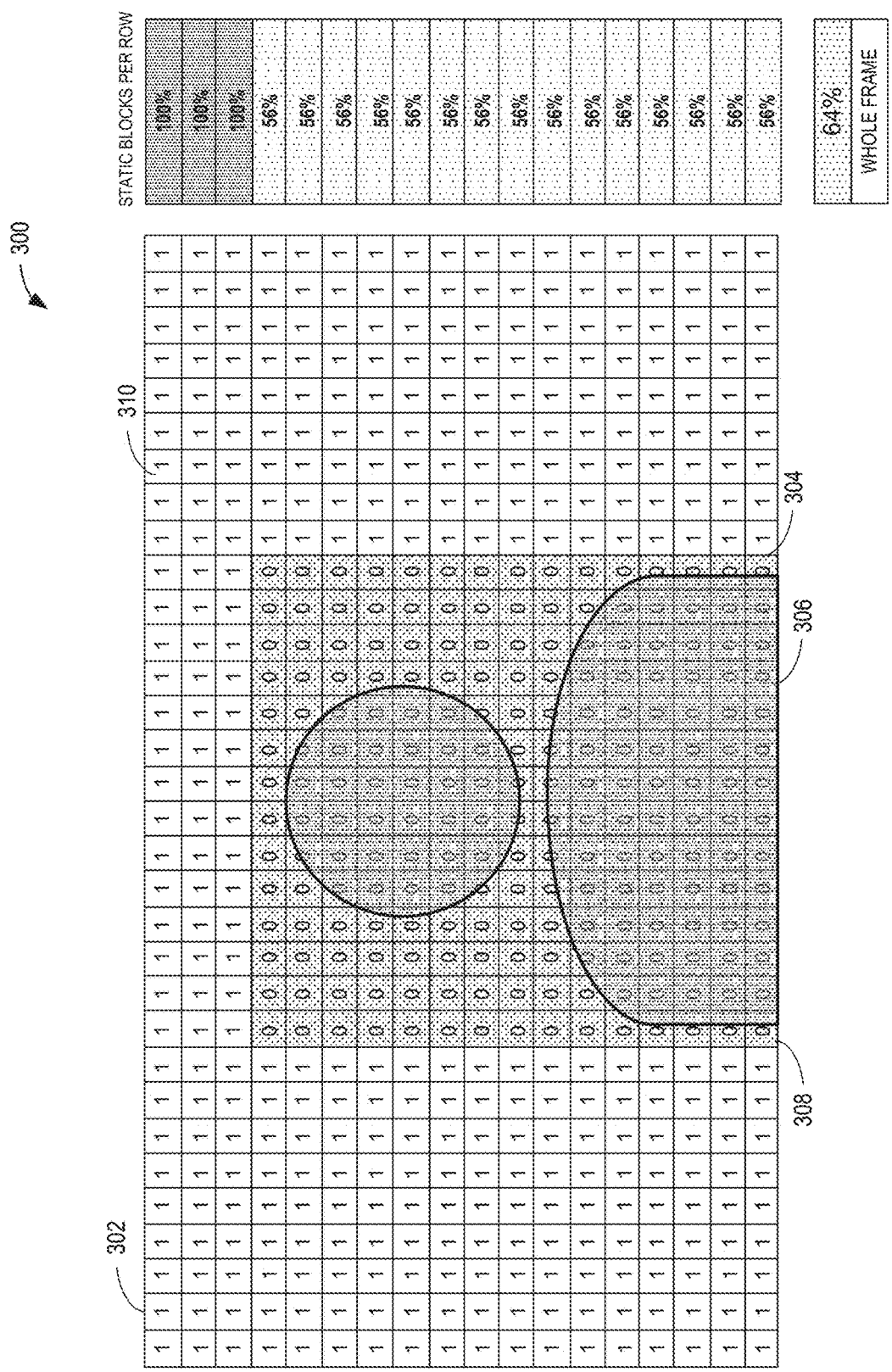
FIG. 3 illustrates an example image captured by a camera of the user device including a user and encoding blocks.

FIG. 3 illustrates an example video frame 300 subdivided into a plurality of coding blocks 302. In the example of FIG. 3, the video frame 300 is divided into a grid of coding blocks 302 that is 18 blocks tall by 32 blocks wide. In other examples, the video frame 300 can be subdivided into more or less coding blocks than shown in FIG. 3. During video encoding, a video frame (e.g., the video frame 300) is subdivided into square coding blocks (e.g., the coding blocks 302). For example, in H.264 (AVC) encoding, a video frame is subdivided into a grid of 16 by 16 coding blocks. In the example of H.265 (HVEC or AV1) encoding, a video frame is subdivided into a grid of 64 by 64 coding blocks. During encoding of the video frame, an encoder (e.g., the encoder circuitry 230) encodes each of the coding blocks 302. The example encoder circuitry 230 can form predictions for each of the coding blocks 302 based on previously encoded blocks from either the current video frame or a previous video frame. When forming predictions for a coding block 302 based on previously encoded blocks from a previous video frame, the example encoder circuitry 230 can search an area of the previous video frame for a block that matches the coding block 302. Once a matching coding block is found, the example encoder circuitry 230 can generate a motion vector corresponding to a movement of the coding block from the previous frame to the current frame. Additionally, in some examples, the example encoder circuitry 230 can choose to skip encoding for a coding block if, for example, the coding block is distorted and/or if the encoder finds the coding block has no movement from the previous frame. The example encoder circuitry 230 can include metadata in the encoded video frame corresponding to the motion vectors and the skip blocks.

In some examples, the example encoder circuitry 230 searches a large portion (e.g., the entire frame) of the previous video frame when looking for a matching coding block. In other examples, the example encoder circuitry 230 searches a smaller portion of the previous video frame when looking for a matching coding block. In the example of FIG. 3, a bounding box 304 is provided to the example encoder circuitry 230. The bounding box 304 indicates an area of the video frame 300 including portions which are changed from a previous frame. In the example of FIG. 3, the bounding box 304 includes an area of the video frame 300 including an image of a portion of a user 306. The area of the video frame 300 inside the bounding box 304 includes dirty coding blocks 308. When encoding the video frame, the example encoder circuitry 230 can encode each of the dirty coding blocks 308 normally (e.g., performing search). In some examples, the example encoder circuitry 230 can search only the area corresponding to the bounding box 304 when looking for matching coding blocks. An area of the video frame 300 outside of the bounding box 304 includes static coding blocks 310. For static coding blocks 310, the example encoder circuitry 230 can skip the search (e.g., skip encoding), thus saving processing power. In the example of FIG. 3, 64 percent of the video frame 300 includes static coding blocks 310. Therefore, in the illustrated example, the example encoder circuitry 230 can skip encode searching for 64 percent of the video frame 300. Additionally, during encoding, the example encoder circuitry 230 can write the encoded image to the memory (e.g., the storage device(s) 214) as a future reference frame. In examples disclosed herein, the example encoder circuitry 230 can overwrite the previous reference frame only in the areas inside of the bounding box 304 (e.g., including dirty coding blocks 308). In the example of FIG. 3, 36 percent of the video frame 300 includes dirty coding blocks 308. Therefore, only 36 percent of the video frame 300 would be written to the memory by the example encoder circuitry 230. Additionally, during the write process, the example encoder circuitry 230 can embed the bounding box 304 as metadata in the reference image.

During decoding of the video frame 300, a decoder (e.g., the decoder circuitry 234 of FIG. 2) can determine a dirty portion (e.g., including the dirty coding blocks 308) and a static portion (e.g., including the static coding blocks 310) of the video frame 300. In some examples, the example decoder circuitry 234 can determine the dirty portion and the static portion of the video frame 300 based on a bounding box (e.g., the bounding box 304). In other examples, the example decoder circuitry 234 can determine the dirty portion and the static portion of the video frame 300 based on metadata in the encoded frame including motion vectors and information identifying the skip blocks. The example decoder circuitry 234 can then decode the dirty portion (e.g., including the dirty coding blocks 308) of the video frame and skip decoding on the static portion (e.g., including the static coding blocks). Additionally, when writing a decoded reference frame, the example decoder circuitry 234 can write only the decoded portion (e.g., the dirty portion including the dirty coding blocks 308) of the video frame 300. Further processing of the image therefore is also done only with the decoded portion, thus saving processing power in operations such as combining decoded images into a grid view buffer and/or updating a display.

Figure 4:
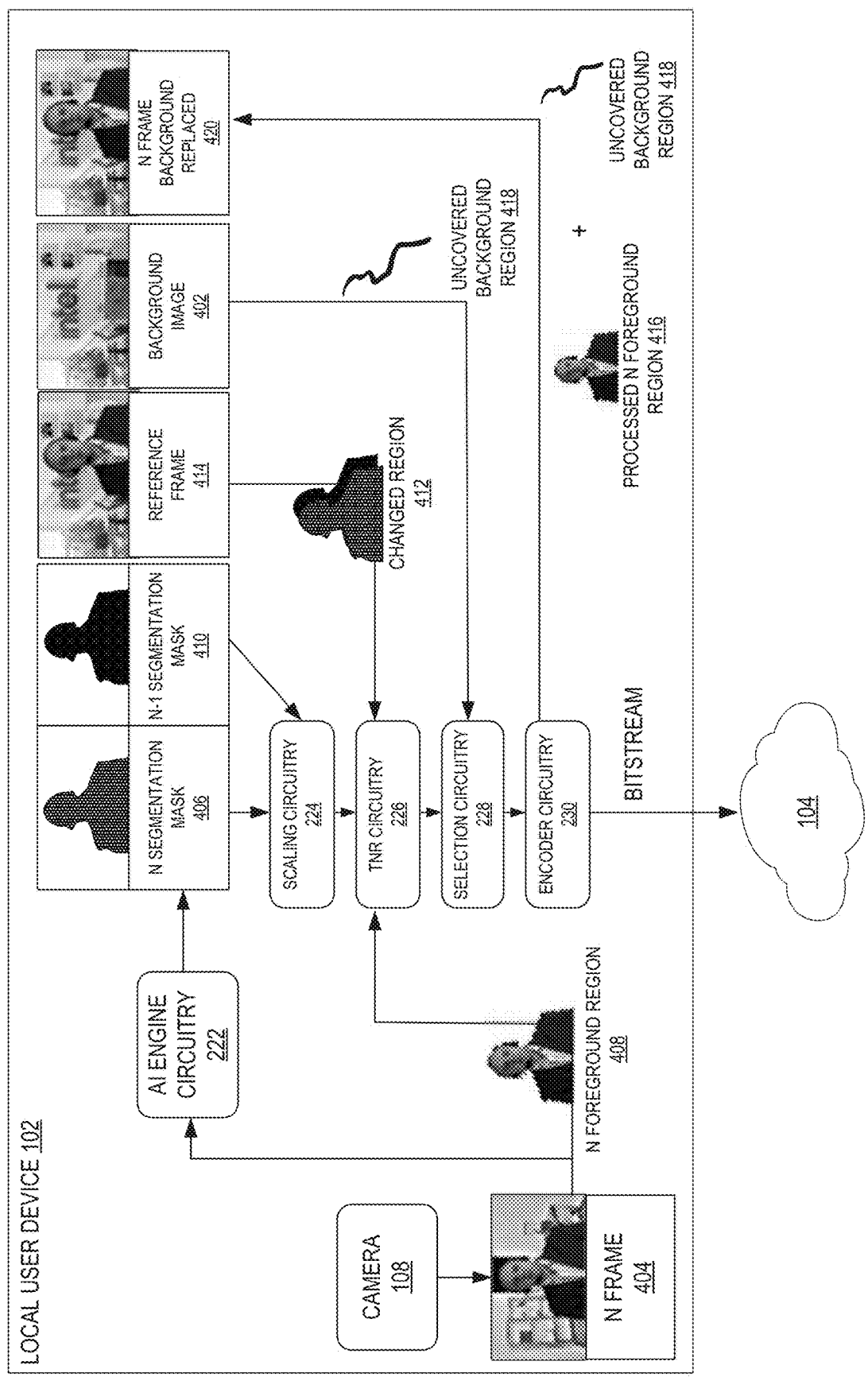
FIG. 4 is a block diagram of example implementation of the image processing circuitry of FIG. 2 to process images captured by the user device.

FIG. 4 is a block diagram of an example implementation of the image processing circuitry 220 of FIG. 2 to process images generated by the camera 108 of the local user device 102. In the illustrated example, the camera 108 generates image(s) including a depiction of a user of the local user device 102 during operation of the video conferencing application 212. In the example of FIG. 4, a background portion of the image(s) is replaced with a background image 402. For example, the background portion of the image generated for video conferencing may include a home office. The user may choose to replace the background portion including the home office with a chosen background image 402 such as an image of a corporate workspace or an image of a cityscape. In other examples, the background image 402 includes an image generated previously by the camera 108 including the user with a blur effect applied. In the example implementation illustrated in FIG. 4, an N item refers to an item associated with the current time step. Additionally, an N−1 item refers to an item associated with the previous time step.

To begin, the camera 108 generates an N frame 404 (e.g., a video frame corresponding to the current time step). In some examples, the N frame 404 has a 1080p resolution. In FIG. 4, the N frame 404 is written to the storage device(s) 214. The local user device 102 of FIG. 4 includes the AI engine circuitry 222. In the example of FIG. 4, the AI engine circuitry 222 reads the N frame 404 from the storage device(s) 214. In other examples, the camera 108 passes the N frame 404 directly to the AI engine circuitry 222. The example AI engine circuitry 222 analyzes the N frame 404 to determine an N segmentation mask 406. The N segmentation mask 406 indicates a portion of the N frame 404 corresponding to an N foreground region 408. In the example of FIG. 4, the segmentation masks (e.g., the N segmentation mask 406 and/or an N−1 segmentation mask 410) have a resolution of 512 pixels by 512 pixels. The local user device 102 of FIG. 4 includes the scaling circuitry 224. The example scaling circuitry 224 can scale the resolution of the segmentation mask(s) (e.g., the N segmentation mask 406 and/or an N−1 segmentation mask 410) such that the segmentation masks can be used with the higher resolution video frames (e.g., the N frame 404, etc.). For example, the scaling circuitry 224 can read the N segmentation mask 406 and the N−1 segmentation mask 410 from the storage device(s) 214. The example scaling circuitry 224 then adjusts the resolution of the segmentation masks (e.g., the N segmentation mask 406 and/or an N−1 segmentation mask 410). For example, the scaling circuitry 224 can increase the height in pixels of the N segmentation mask 406 from 512 pixels to 1080 pixels to match that of the N frame 404. The scaling circuitry 224 can apply the same scaling factor to each of the N segmentation mask 406 and the N−1 segmentation mask 410.

In the example of FIG. 4, the example TNR circuitry 226 receives the scaled N segmentation mask 406 and the scaled N−1 segmentation mask 410 from the scaling circuitry 224 directly. In other words, the scaled segmentation masks are not read to and/or written from the storage device(s) 214 when being transferred from the scaling circuitry 224 to the TNR circuitry 226. The example TNR circuitry 226 reads a portion of the N frame 404 from the storage device(s) 214. In FIG. 4, the example TNR circuitry 226 uses the scaled N segmentation mask 406 to read only the N foreground region 408 of the N frame 404. Additionally, the example TNR circuitry 226 determines a changed region mask of a reference frame 414 stored in the storage device(s) 214. In the example of FIG. 4, the reference frame 414 is the N−1 frame with a replaced background as determined at the previous image processing iteration. The changed region mask is a union of the foreground region defined by the N segmentation mask 406 and the foreground region defined by the N−1 segmentation mask 410. A changed region 412 is a portion of the reference frame 414 defined by the changed region mask. In other words, the changed region 412 includes all foreground regions of the N frame 404 and the reference frame 414 (e.g., the N−1 frame). The example TNR circuitry 226 reads from the storage device(s) 214 the changed region 412.

After reading both the N foreground region 408 and the changed region 412, the example TNR circuitry 226 performs noise reduction (e.g., temporal noise reduction) on the N foreground region 408 using the changed region 412 as reference. For example, the TNR circuitry 226 can map each of the pixels in the N foreground region 408 to the changed region 412 to determine a co-located pixel. In some examples, the TNR circuitry 226 determines that the co-located pixel is in the changed region 412. In this case, the example TNR circuitry 226 can use a standard temporal denoise process to filter the pixel. In other examples, the TNR circuitry 412 determines that the co-located pixel is not in the changed region 412. In other words, the co-located pixel is located in a portion of the reference frame 414 corresponding to a background region of the reference frame 414. In this case, the example TNR circuitry 412 uses spatial filtering on the pixel. Because spatial filtering uses less computation than temporal denoise filtering, filtering the pixels for which the co-located pixel is determined to not be in the changed region 412 (e.g., the co-located pixel is in the background region of the reference frame 414) uses less processing power than if a standard TNR process were to be used. Additionally, using spatial filtering on the pixels for which the co-located pixel is determined to not be in the changed region 412 can result in a higher quality filter on the pixel by the example TNR circuitry 226. For example, the TNR circuitry 226 does not attempt to calculate motion information for a pixel in the N foreground region 408 for which a co-located pixel is in the background region of the reference frame 414. In some examples, motion information calculated for a pixel in the N foreground region 408 based on a co-located pixel in the background region of the reference frame 414 may be inaccurate. Therefore, applying spatial filtering instead of temporal denoise filtering to the pixel can result in a higher quality filter on the pixel. As a result of the filtering, the example TNR circuitry 226 generates a processed N foreground region 416.

The example processing circuitry 208 of FIG. 4 includes the selection circuitry 228. The example selection circuitry 228 determines an uncovered background region mask and reads an uncovered background region 418 from the storage device(s) 214. For example, the selection circuitry 228 receives the scaled N segmentation mask 406 and the scaled N−1 segmentation mask 410 from the TNR circuitry 226. In other examples, the selection circuitry 228 can receive the scaled N segmentation mask 406 and the scaled N−1 segmentation mask 410 directly from the scaling circuitry 224. The example selection circuitry 228 can determine the uncovered background region mask as the foreground region defined by the N segmentation mask 406 subtracted from the foreground region defined by the N−1 segmentation mask 410. The uncovered background region 418 is a portion of the background image 402 defined by the uncovered background region mask. In other words, the uncovered background region 418 is a portion of the background image 402 which was obscured by the foreground in the reference frame 414 (e.g., the N−1 frame) but that is uncovered in the N frame 404 due to movement of the N foreground region 408. After determining the uncovered background region mask, the example selection circuitry 228 reads the uncovered background region 418 portion of the background image 402 from the storage device(s) 214.

The example processor circuitry 208 of FIG. 4 includes the encoder circuitry 230. In the example of FIG. 4, the example encoder circuitry 230 receives the uncovered background region 418 and the processed N foreground region 416 from the selection circuitry 228. In other examples, the example encoder circuitry 230 can receive the processed N foreground region 416 from the TNR circuitry 226. Additionally, the example encoder circuitry 230 receives the changed region 412 of the reference frame 414 from the TNR circuitry 226. Using the changed region 412 as a reference, the example encoder circuitry 230 encodes an updated frame portion including the processed N foreground region 416 and the uncovered background region 418 to generate an N frame with replaced background 420. For example, the encoder circuitry 230 encodes each coding block within the processed N foreground region 416 and the uncovered background region 418. The example encoder circuitry 230 can use the encoding processed described above in connection with FIG. 3 including searching for matching coding blocks and including metadata to encode each of the coding blocks. After encoding, the example encoder circuitry 230 writes the updated frame portion including the processed N foreground region 416 and the uncovered background region 418 to the reference frame 414 to generate the N frame with replaced background 420. Once generated, the N frame with replaced background 420 is used as the reference frame 414 for the next iteration. Additionally, the example encoder circuitry 230 of FIG. 4 transmits the N frame with replaced background 420 via the network 104 to the video conferencing output device(s) 232.

During a video conference (e.g., during operation of the video conferencing application 212), the camera 108 of the local user device 102 generates the video frames over time. The local user device 102 including the AI engine circuitry 222, the scaling circuitry 224, the TNR circuitry 226, the selection circuitry 228, and the encoder circuitry 230 process new video frames over time. As a result, the example local user device 102 of FIGS. 2 and/or 4 provides for processing (e.g., performing image processing, replacing a background, encoding, etc.) images captured during video conferencing using reduced memory bandwidth.

Figure 5A:
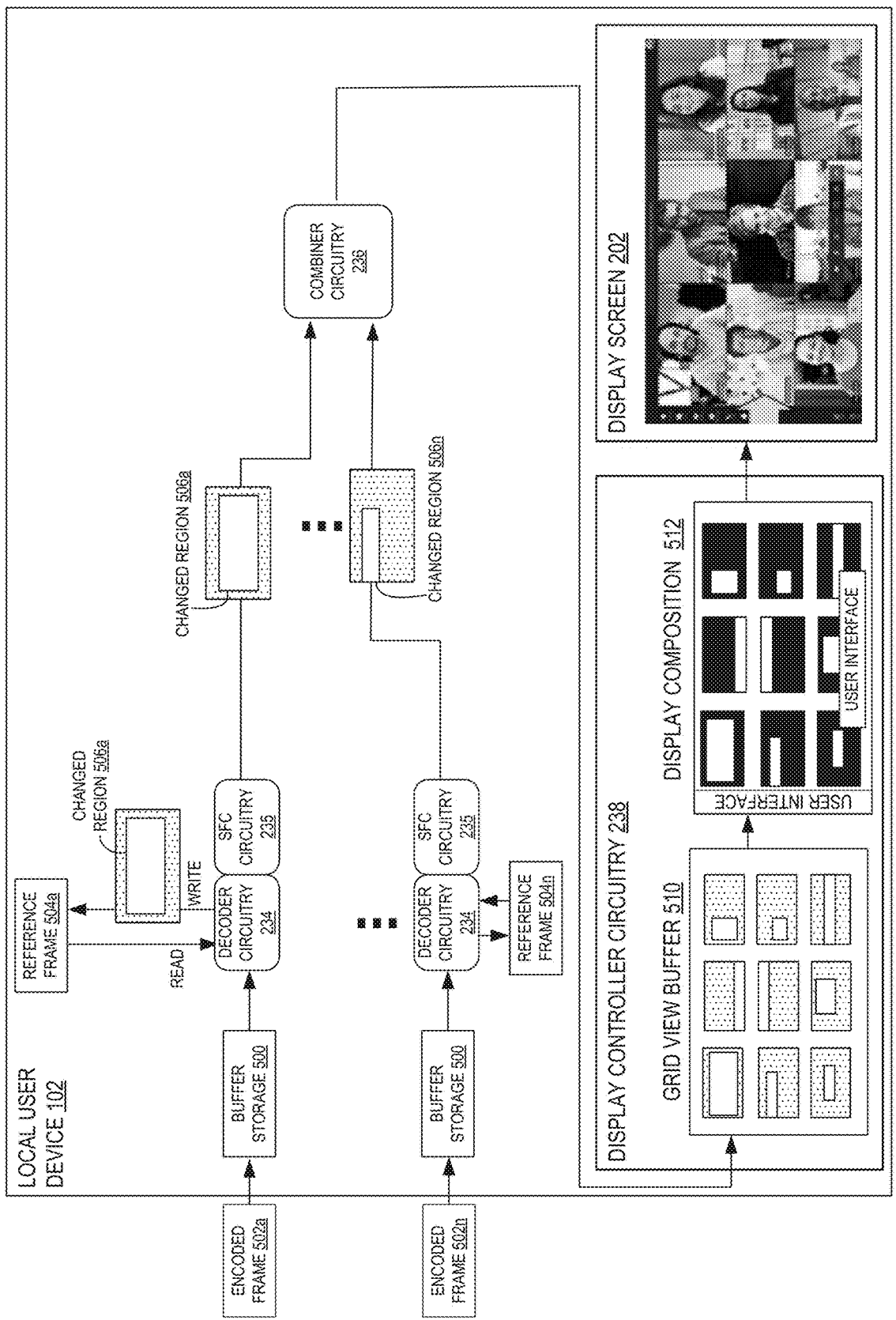
FIG. 5A is a block diagram of example implementation of the image processing circuitry of FIG. 2 to process images received at the user device.

FIG. 5A is a block diagram of an example implementation of the image processing circuitry 220 of FIG. 2 to process images received at the local user device 102. In the example implementation illustrated in FIG. 5A, an N item refers to an item associated with the current time step. Additionally, an N−1 item refers to an item associated with the previous time step. As discussed above in conjunction with FIG. 1, the example local user device 102 can receive a plurality of images from a plurality of user devices (e.g., the remote user device 106a, the remote user device 106b, the remote user device 106n, etc.). The example local user device 102 can receive the plurality of images during operation of the video conferencing application 212. Each of the plurality of images can include a portion of a user of the respective output device. Each of the images is encoded by the respective output device before being transmitted (e.g., via the network 104) to the local user device 102. The example local user device 102 of FIG. 5A includes a buffer storage 500. The example buffer storage 500 can be included in the storage device(s) 214 of FIG. 2. The example local user device 102 of FIG. 5A receives a first encoded frame 502a at the buffer storage 500. The example local user device 102 of FIG. 5A includes the decoder circuitry 234. The example decoder circuitry 234 reads the encoded frame 502a from the buffer storage 500. The example decoder circuitry 234 also reads a reference frame 504a from the storage device(s) 214. In the example of FIG. 5A, the reference frame 504a of FIG. 5A is the N−1 frame that was decoded at the previous iteration.

Using the reference frame 504a as a decoding reference, the example decoder circuitry 234 decodes the encoded frame 502a, as discussed below in further detail in connection with FIG. 5B. In the example of FIG. 5A, the encoded frame 502a includes metadata indicating a dirty portion of the frame and a static portion of the frame. The metadata included in the encoded frame 502a can include motion vectors and information identifying the skip blocks as discussed above in connection with FIG. 3. The dirty portion of the frame includes coding blocks (e.g., the dirty coding blocks 308 of FIG. 3) which can contain data that is changed from a previous iteration. The static portion of the frame includes coding blocks (e.g., the static coding blocks 310 of FIG. 3) which contain data that is unchanged from the previous iteration. The example decoder circuitry 234 utilizes the metadata to decode only the dirty portion of the encoded frame 502a. The example decoder circuitry 234 can skip decoding on the static portion of the encoded frame 502a. As a result, the example decoder circuitry 234 generates a decoded changed region 506a. The changed region 506a includes only the portion of the encoded frame 502a indicated by the metadata as containing dirty encoding blocks. After decoding the changed region 506a, the example decoder circuitry 234 writes the changed region 506a to the reference frame 504a. Therefore, the reference frame 504a becomes updated with the changed region 506a for the subsequent iteration.

At each time step, each of the plurality of output devices (e.g., the remote user device 106a, the remote user device 106b, the remote user device 106b, etc.) can transmit a video frame (e.g., the encoded frame 502a, an encoded frame 502n, etc.) to the local user device 102. Each of the video frames (e.g., the encoded frame 502a, the encoded frame 502n, etc.) are received in the buffer storage 500 of FIG. 5A. For each of the video frames, the example decoder circuitry 234 can decode a changed region (e.g., the changed region 506a, a changed region 506n, etc.) using a corresponding reference frame (e.g., the reference frame 504a, a reference frame 504n, etc.).

The example local user device 102 of FIG. 5A includes the SFC circuitry 235. In the example of FIG. 5A, the SFC circuitry 235 is directly connected to the decoder circuitry 234. In other words, the example SFC circuitry 235 can receive data from the decoder circuitry 234 without the data being written to and read from the memory (e.g., the storage device(s) 214) of the local user device 102. In the example of FIG. 5A, the SFC circuitry 235 receives the decoded changed region 506a directly (e.g., without reading from the memory) from the decoder circuitry 234. The example SFC circuitry 235 can perform scaling and format conversion on the changed region 506a to prepare the changed region 506a for display on the display screen 202. The example SFC circuitry 235 receives and processes each of the decoded changed regions (e.g., the changed region 506a, the changed region 506n, etc.). The example SFC circuitry 235 provides each of the changed regions to the combiner circuitry 236 included in the local user device 102 of FIG. 5A. In the example of FIG. 5A, the combiner circuitry 236 writes the changed regions (e.g., the changed region 506a, the changed region 506n, etc.) to a grid view buffer 510. The example grid view buffer 510 can be stored in the storage device(s) 214 of the local user device 102. In the example of FIG. 5A, the grid view buffer 510 is a high resolution (e.g., 1080p) image including 2.97 MB of data. The example grid view buffer 510 includes a plurality of regions, each of the regions corresponding to a video stream for each of the plurality of output devices (e.g., the remote user device 106a, the remote user device 106b, etc.). In the example of FIG. 5A, a sum of the changed regions 506a, 506n make up only a portion (e.g., 30 percent) of the grid view buffer 510. As a result, the changed regions 506a, 506n include less data (e.g., 2 MB less) than the example grid view buffer 510. Therefore, the example combiner circuitry 236 writes less data (e.g., 60 percent less) to the storage device(s) 214 when writing the changed regions 506a, 506n than if the combiner circuitry 236 were to write an entire grid view. The example grid view buffer 510 can also include metadata from the changed regions 506a, 506n indicating the portions of the grid view buffer 510 corresponding the changed regions 506a, 506n.

The example local user device 102 of FIG. 5A includes the display controller circuitry 238. The example display controller circuitry 238 generates a display composition 512 and updates the display screen 202. The display composition 512 includes the image data included the grid view buffer 510 and components of a user interface of the video conferencing application 212. The example display controller circuitry 238 generates the display composition 512 by combining the grid view buffer 510 with the user interface components of the video conferencing application 212. The example display composition 512 can include the metadata from the grid view buffer 510 indicating the portions of the display composition 512 corresponding to the changed regions 506a, 506n. Subsequently, the example display controller circuitry 238 updates the display screen 202 with the display composition 512. In the example of FIG. 5A, the display controller circuitry 238 selectively updates the display screen 202 with the changed regions 506a, 506n. For example, the display controller circuitry 238 uses the metadata included in the display composition 512 to determine the changed regions of the display composition 512. Then, the example display controller circuitry 238 can read the changed regions 506a, 506n. As explained above, the sum of the changed regions 506a, 506n includes less (e.g., 70 percent less) data than the grid view buffer 510. Accordingly, the sum of the changed regions 506a, 506n includes less (e.g., 75 percent less) data than the display composition 512. Therefore, reading only the sum of the changed regions 506a, 506n rather than the display composition 512 can use less (e.g., 75 percent less) memory related processing power. The example display controller circuitry 238 can selectively update the display screen 202 with the changed regions 506a, 506n. Similarly, because the sum of the changed regions 506a, 506n include less (e.g., 75 percent less) data than the display composition 512, selectively updating the display screen 202 with only the sum of the changed regions 506a, 506n rather than the display composition 512 can use less processing power.

During a video conference (e.g., during operation of the video conferencing application 212), the camera(s) 110a, 110n of the remote user device(s) 106a, 106n generate the encoded frames 502a, 502n over time. The example local user device 102 including the decoder circuitry 234, the SFC circuitry 235, the combiner circuitry 236, and the display controller circuitry 238 process new encoded frames received over time. As a result, the example local user device 102 of FIGS. 2 and/or 5A provides for processing (e.g., performing image processing, decoding, displaying) images received during a video conference using reduced memory bandwidth.

Figure 5B:
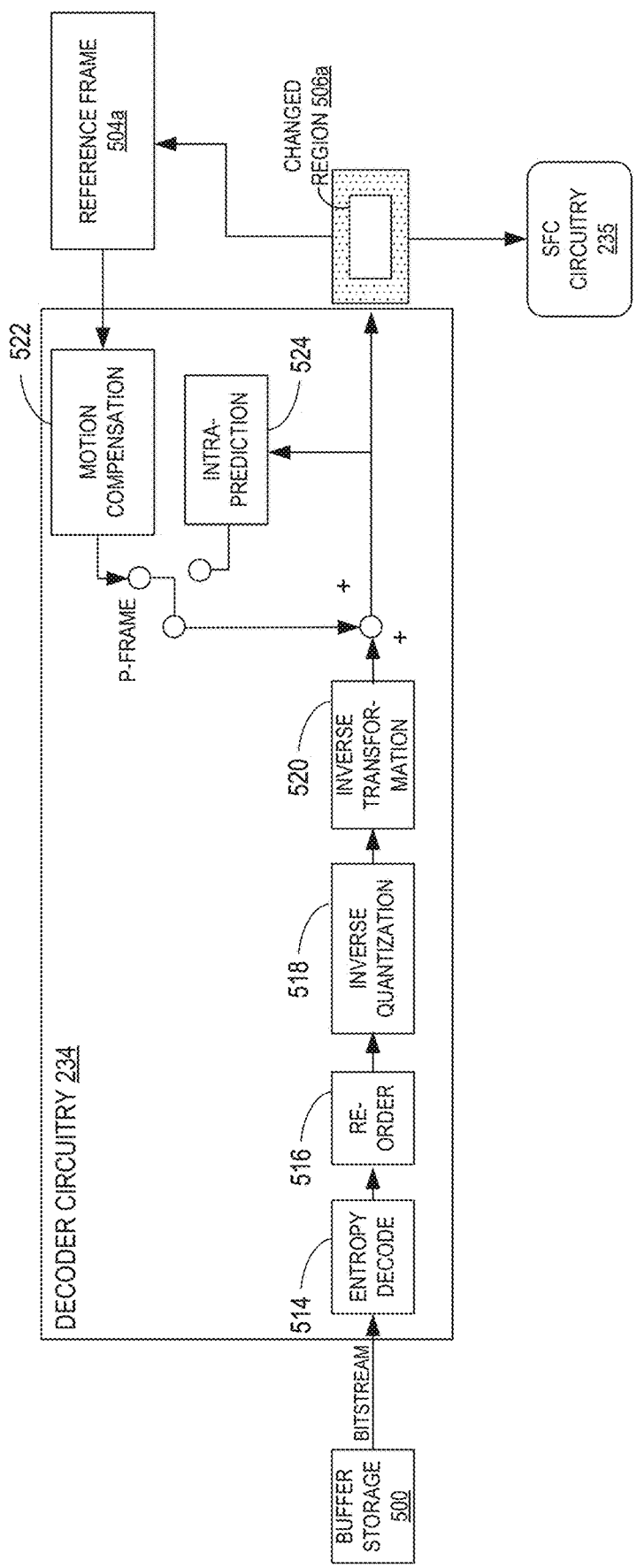
FIG. 5B is a block diagram of example implementation of the image processing circuitry of FIG. 2 to decode images received at the user device.

FIG. 5B is a block diagram of an example implementation of the image processing circuitry 220 of FIG. 2 to decode images received at the local user device 102. As explained above, the decoder circuitry 234 receives image data corresponding to an N video frame from the buffer storage 500. In the example of FIG. 5B, the decoder circuitry 234 receives the data from the buffer storage 500 as bitstream data. In the example of FIG. 5B, the image is encoded using a standard encoding such as H.264. In other examples, a different encoding standard can be used. As shown in FIG. 3, during encoding, the image is divided into coding blocks (e.g., the coding blocks 302). The example decoding circuitry 234 of FIG. 5B processes each of the coding blocks in sequence beginning with an entropy decode (block 514) and reordering (block 516) resulting in decoded transform coefficients. At blocks 518 and 520, the decoder circuitry 234 performs an inverse quantization and an inverse transformation on the decoded transform coefficients, respectively, to generate difference macroblocks.

As explained above, the example decoding circuitry 234 reads the reference frame 504a from the storage device(s) 214. At block 522, the example decoding circuitry 234 uses the reference frame 504 along with the bitstream data to perform motion compensation and generate a prediction macroblock frame (P-frame) 523. Additionally, the example decoding circuitry 234 uses the bitstream data to perform intra-prediction at block 524. The difference macroblocks are combined with the P-frame 523 and the intra-prediction to generate decoded macroblocks. In the example of FIG. 5B, the decoder circuitry 234 decodes only the portion of the bitstream determined to include dirty macroblocks. As such, a size of the decoded region (e.g., the changed region 506a) is less than a size of the encoded frame.

The example decoder circuitry 234 writes the changed region 506a to the reference frame 504a as explained above to update the reference frame 504 with the N video frame. Additionally, the SFC circuitry 235 receives the decoded changed region 506a directly from the decoder circuitry 234. The changed region 506a is further processed for display by the combiner circuitry 236 and the display composition circuitry 238 as discussed above in connection with FIG. 5A. The example decoder circuitry 234 completes the above described decode process of FIG. 5B for each of the N video frames received from each of the plurality of output devices (e.g., the remote user device 106a, the remote user device 106b, the remote user device 106n, etc.).

In some examples, the image processing circuitry 220 includes means for determining an uncovered region of a background image. For example, the means for determining may be implemented by the selection circuitry 228. In some examples, the selection circuitry 228 may be implemented by machine executable instructions such as that implemented by at least blocks 716, 718 of FIG. 7 and block 902 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the selection circuitry 228 is implemented by other hardware logic circuitry, hardware implemented state machines, and/or any other combination of hardware, software, and/or firmware. For example, the selection circuitry 228 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for generating an updated frame portion. For example, the means for generating may be implemented by the encoder circuitry 230. In some examples, the encoder circuitry 230 may be implemented by machine executable instructions such as that implemented by at least block 720 of FIG. 7 and block 904 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the encoder circuitry 230 is implemented by other hardware logic circuitry, hardware implemented state machines, and/or any other combination of hardware, software, and/or firmware. For example, the encoder circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for storing an updated frame portion. For example, the means for storing may be implemented by the encoder circuitry 230. In some examples, the encoder circuitry 230 may be implemented by machine executable instructions such as that implemented by at least block 722 of FIG. 7 and block 906 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the encoder circuitry 230 is implemented by other hardware logic circuitry, hardware implemented state machines, and/or any other combination of hardware, software, and/or firmware. For example, the encoder circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for performing noise reduction. For example, the means for performing may be implemented by the TNR circuitry 226. In some examples, the TNR circuitry 226 may be implemented by machine executable instructions such as that implemented by at least blocks 714 of FIG. 7 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the TNR circuitry 226 is implemented by other hardware logic circuitry, hardware implemented state machines, and/or any other combination of hardware, software, and/or firmware. For example, the TNR circuitry 226 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for determining a foreground region. For example, the means for determining may be implemented by the AI engine circuitry 222. In some examples, the AI engine circuitry 222 may be implemented by machine executable instructions such as that implemented by at least blocks 702, 704, 706, 708 of FIG. 7 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the AI engine circuitry 222 is implemented by other hardware logic circuitry, hardware implemented state machines, and/or any other combination of hardware, software, and/or firmware. For example, the AI engine circuitry 222 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for including metadata. For example, the means for including may be implemented by the encoder circuitry 230. In some examples, the encoder circuitry 230 may be implemented by machine executable instructions such as that implemented by at least blocks 720, 722 of FIG. 7 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the encoder circuitry 230 is implemented by other hardware logic circuitry, hardware implemented state machines, and/or any other combination of hardware, software, and/or firmware. For example, the encoder circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for generating a changed region. For example, the means for generating may be implemented by the decoder circuitry 234. In some examples, the decoder circuitry 234 may be implemented by machine executable instructions such as that implemented by at least blocks 802, 804, 806 of FIG. 8 and blocks 1002, 1004 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the decoder circuitry 234 is implemented by other hardware logic circuitry, hardware implemented state machines, and/or any other combination of hardware, software, and/or firmware. For example, the decoder circuitry 234 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for combining changed regions. For example, the means for combining may be implemented by the combiner circuitry 236. In some examples, the combiner circuitry 236 may be implemented by machine executable instructions such as that implemented by at least block 616 of FIG. 6, blocks 810, 812, 814 of FIG. 8 and block 1006 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the combiner circuitry 236 is implemented by other hardware logic circuitry, hardware implemented state machines, and/or any other combination of hardware, software, and/or firmware. For example, the combiner circuitry 236 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for selectively updating a display screen. For example, the means for updating may be implemented by the display controller circuitry 238. In some examples, the display controller circuitry 238 may be implemented by machine executable instructions such as that implemented by at least block 618 of FIGS. 6 and/or 8 and block 1008 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the display controller circuitry 238 is implemented by other hardware logic circuitry, hardware implemented state machines, and/or any other combination of hardware, software, and/or firmware. For example, the display controller circuitry 238 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for determining dirty blocks of a video frame. For example, the means for determining may be implemented by the decoder circuitry 234. In some examples, the decoder circuitry 234 may be implemented by machine executable instructions such as that implemented by at least block 804 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the decoder circuitry 234 is implemented by other hardware logic circuitry, hardware implemented state machines, and/or any other combination of hardware, software, and/or firmware. For example, the decoder circuitry 234 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing circuitry 220 includes means for writing a changed region to a memory. For example, the means for writing may be implemented by the decoder circuitry 234. In some examples, the decoder circuitry 230 may be implemented by machine executable instructions such as that implemented by at least blocks 806 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the decoder circuitry 234 is implemented by other hardware logic circuitry, hardware implemented state machines, and/or any other combination of hardware, software, and/or firmware. For example, the decoder circuitry 234 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the image processing circuitry 220 of FIG. 2 is illustrated in FIG. 4, one or more of the elements, processes, and/or devices illustrated in FIG. 4 may be combined, divided, re-arranged, omitted, eliminated, and/or implemented in any other way. Further, the example AI engine circuitry 222, the example scaling circuitry 224, the example TNR circuitry 226, the example selection circuitry 228, the example encoder circuitry 230, and/or, more generally, the example image processing circuitry 220 of FIG. 2, may be implemented by hardware alone or by hardware in combination with software and/or firmware. Thus, for example, any of the example AI engine circuitry 222, the example scaling circuitry 224, the example TNR circuitry 226, the example selection circuitry 228, the example encoder circuitry 230, and/or, more generally, the example image processing circuitry 220, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example image processing circuitry 220 of FIG. 2 may include one or more elements, processes, and/or devices in addition to, or instead of, those illustrated in FIG. 4, and/or may include more than one of any or all of the illustrated elements, processes and devices.

While an example manner of implementing the image processing circuitry 220 of FIG. 2 is illustrated in FIG. 5A, one or more of the elements, processes, and/or devices illustrated in FIG. 5A may be combined, divided, re-arranged, omitted, eliminated, and/or implemented in any other way. Further, the example decoder circuitry 234, the example SFC circuitry 235, the example combiner circuitry 236, the example display controller circuitry 238, and/or, more generally, the example image processing circuitry 220 of FIG. 2, may be implemented by hardware alone or by hardware in combination with software and/or firmware. Thus, for example, any of the example decoder circuitry 234, the example SFC circuitry 235, the example combiner circuitry 236, the example display controller circuitry 238, and/or, more generally, the example image processing circuitry 220, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example image processing circuitry 220 of FIG. 2 may include one or more elements, processes, and/or devices in addition to, or instead of, those illustrated in FIG. 5A, and/or may include more than one of any or all of the illustrated elements, processes and devices.

While an example manner of implementing the image processing circuitry 220 of FIG. 2 is illustrated in FIG. 5B, one or more of the elements, processes, and/or devices illustrated in FIG. 5B may be combined, divided, re-arranged, omitted, eliminated, and/or implemented in any other way. Further, the example decoder circuitry 234, the example SFC circuitry 235, the example combiner circuitry 236, the example display controller circuitry 238, and/or, more generally, the example image processing circuitry 220 of FIG. 2, may be implemented by hardware alone or by hardware in combination with software and/or firmware. Thus, for example, any of the example decoder circuitry 234, the example SFC circuitry 235, the example combiner circuitry 236, the example display controller circuitry 238, and/or, more generally, the example image processing circuitry 220, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example image processing circuitry 220 of FIG. 2 may include one or more elements, processes, and/or devices in addition to, or instead of, those illustrated in FIG. 5B, and/or may include more than one of any or all of the illustrated elements, processes and devices.

Flowcharts representative of example hardware logic circuitry, machine readable instructions, hardware implemented state machines, and/or any combination thereof for implementing the image processing circuitry 220 of FIG. 2 are shown in FIGS. 6-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entirety(ies) of the program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 6-10, many other methods of implementing the example image processing circuitry 220 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6A:
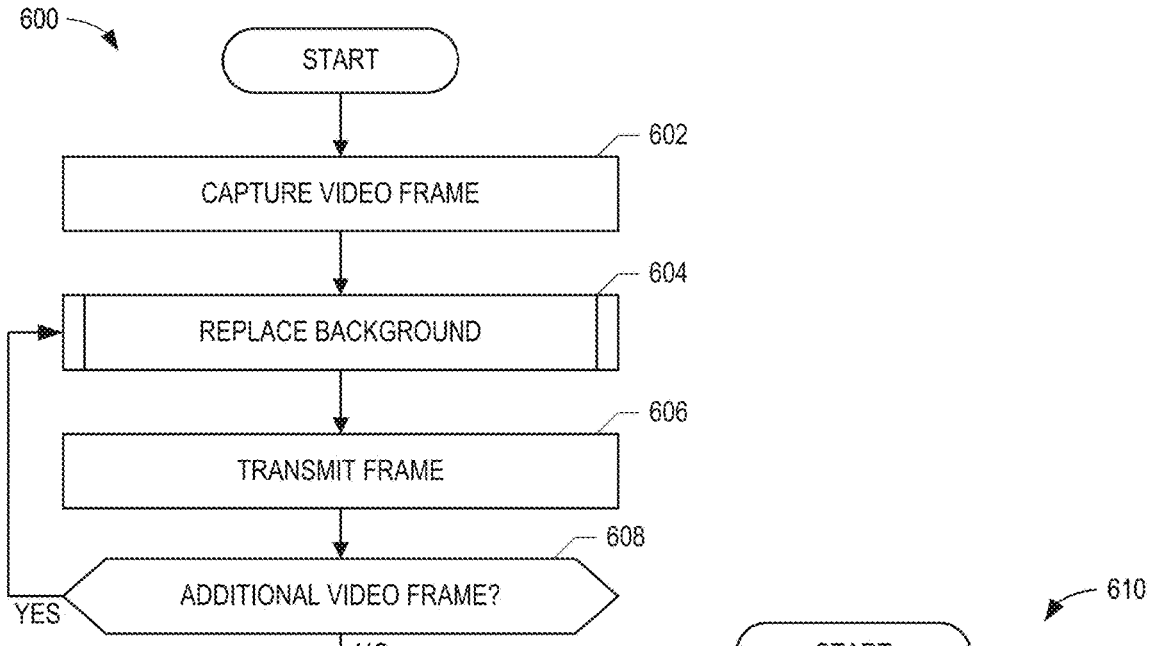
FIGS. 6A, 6B, and 7-10 are flowcharts representative of example machine readable instructions that may be executed by example processor circuitry to implement the image processing circuitry of FIGS. 2, 4, and/or 5.
Figure 6B:
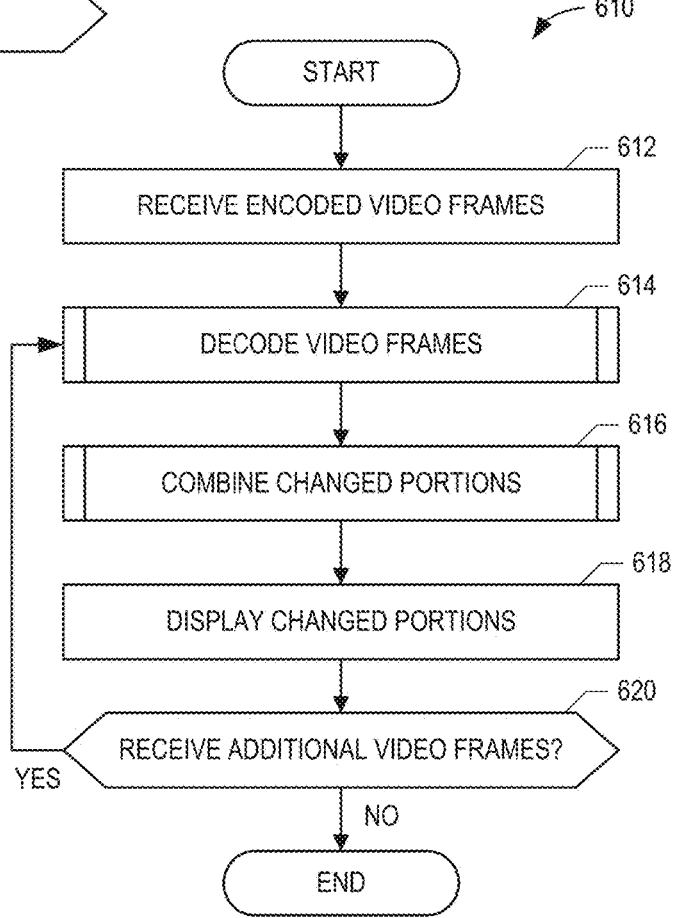

FIGS. 6A and 6B include flowcharts representative of example machine readable instructions and/or operations that may be executed and/or instantiated by processor circuitry to encode and decode video frames during operation of a video conferencing application. FIG. 6A includes a flowchart representative of example machine readable instructions and/or example operations 600 that may be executed and/or instantiated by the example processor circuitry (FIG. 2) to encode video frames during operation of a video conferencing application (e.g., the video conferencing application 212). The machine readable instructions and/or operations 600 of FIG. 6A begin at block 602, at which the camera 108 (FIGS. 1, 2, and 4) captures a video frame. For example, the camera 108 can capture a video frame during operation of the video conferencing application 212. The video frame can include a depiction of a user of the local user device 102. At block 604, the example image processing circuitry 220 (FIG. 2) replaces a background portion of the video frame. For example, the image processing circuitry 220 can replace a static background portion of the video frame with a background image selected by the user. Example instructions that may be executed to implement block 604 are described below in connection with FIG. 7. At block 606, the example encoder circuitry 230 (FIG. 2) transmits the video frame with the replaced background to one or more other user devices (e.g., the video conferencing output device(s) 232). At block 608, the example camera 108 detects if an additional video frame is ready for processing. For example, a video frame captured by the camera 108 may be in a frame buffer ready for processing. If an additional video frame is ready for processing (block 608: YES), the process returns to block 604 to replace the background of the additional video frame. If an additional video frame is not ready for processing (block 608: NO), the example instructions of FIG. 6A end.

FIG. 6B includes a flowchart representative of example machine readable instructions and/or example operations 610 that may be executed and/or instantiated by the example processor circuitry 208 (FIG. 2) to decode video frames during operation of a video conferencing application. The machine readable instructions and/or operations 610 begin at block 612 at which the local user device 102 receives one or more encoded video frames at the buffer storage 500. For example, the local user device 102 can receive the one or more encoded video frames from the remote user device 106a of FIG. 1 which encodes and transmits the video frames during operation of the video conferencing application 212 in substantially the same was as described above in connection with FIG. 6A. In some cases, the local user device 102 can receive additional encoded video frames (e.g., second, third, fourth, fifth, etc. encoded video frames) from additional user devices (e.g., the remoter user devices 106a-n).

At block 614, the example decoder circuitry 234 (FIG. 2) decodes the encoded video frames. For example, the decoder circuitry 234 decodes a changed region of each of the encoded video frames. Example instructions that may be executed to implement block 614 are described below in connection with FIG. 8. At block 616, the example combiner circuitry 236 (FIG. 2) combines the changed portions. For example, the combiner circuitry 236 can combine the changed portions by writing the changed regions (e.g., the changed region 412 of FIG. 4) into a grid view buffer. Example instructions that may be executed to implement block 616 are described below in connection with FIG. 8. At block 618, the example display controller circuitry 238 (FIG. 2) displays the changed regions as discussed further below in connection with FIG. 8. For example, the display controller circuitry 238 generates the display composition 512 (FIG. 5A) by combining the changed regions with components of a user interface. The example display controller circuitry 238 then updates the display screen 202 (FIG. 2) with the changed regions. At block 620, the example decoder circuitry 234 detects if additional video frames are received. If additional video frames are received (block 620: YES), control returns to block 614 to decode the additional video frames. If additional video frames are not received (block 620: NO), the example instructions of FIG. 6B end.

Figure 7:
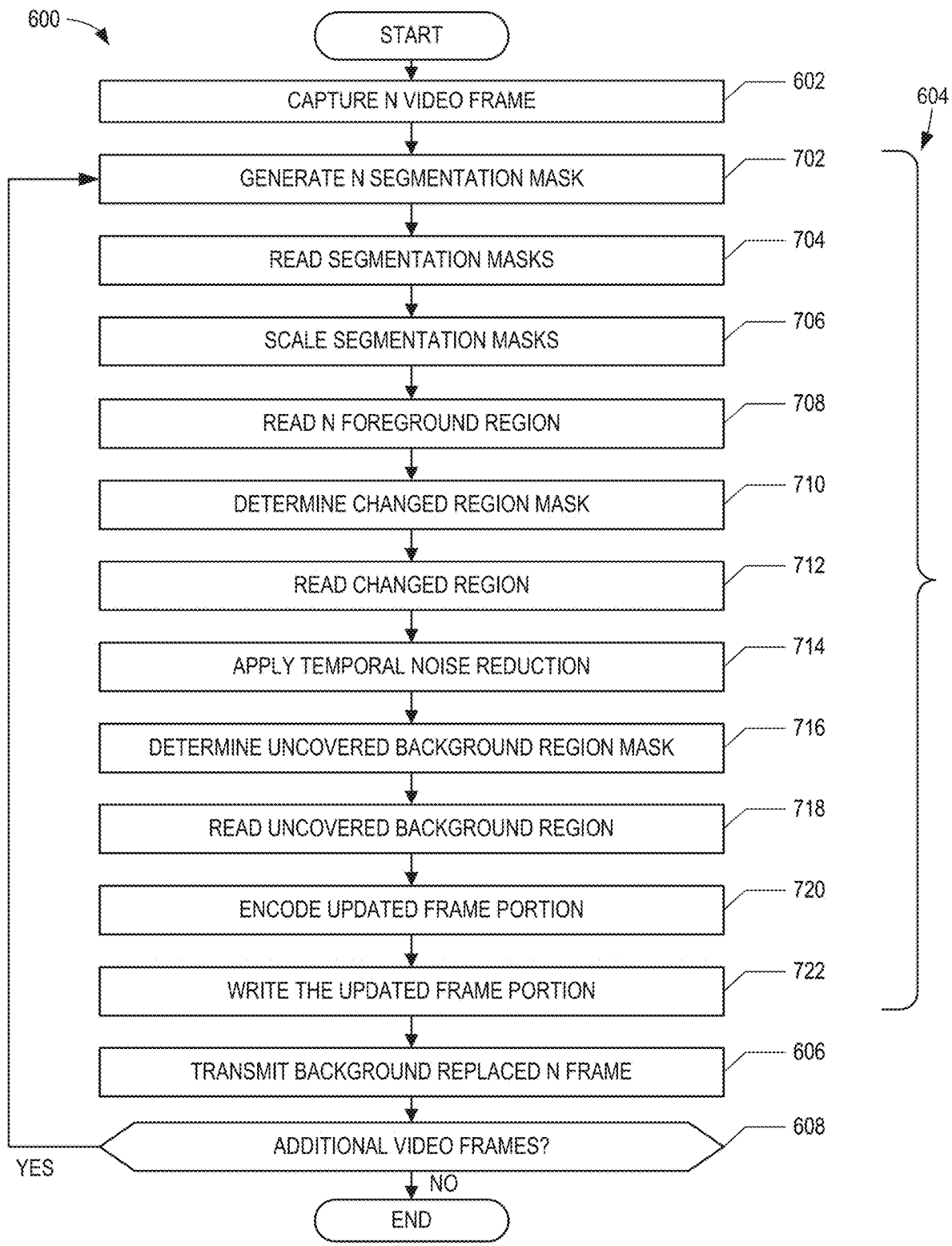

FIG. 7 is a more detailed flowchart representative of the example machine readable instructions and/or example operations 600 of FIG. 6A that may be executed and/or instantiated by processor circuitry to encode video frames during operation of a video conferencing application. In the example implementation of FIG. 7, an N item refers to an item associated with a current time step. Additionally, an N−1 item refers to an item associated with a previous time step. The machine readable instructions and/or operations 600 of FIG. 7 begin at block 602, at which the camera 108 (FIGS. 1 and 2) captures an N video frame (e.g., N frame 404). For example, the camera 108 of the local user device 102 (FIGS. 1 and 2) captures a video frame for the current time step including a depiction of the user of the local user device 102. Machine readable instructions represented by blocks 702 to 722 may be used to implement block 604 (replace background) of FIG. 6A. At block 702, the AI engine circuitry 222 (FIG. 2) generates an N segmentation mask. For example, the AI engine circuitry 222 analyzes the N video frame to determine a portion of the N video frame corresponding to a foreground region. The example AI engine circuitry 222 can use analytics such as motion detection, edge detection, and/or other analysis techniques to determine the foreground region. After the AI engine circuitry 222 determines the foreground region, the example AI engine circuitry 222 can generate an N segmentation mask indicating the foreground region of the N video frame and a background region of the N video frame. In the example of FIG. 7, the foreground region included in the N segmentation mask includes a depiction of the user of the local user device 102. The example AI engine circuitry 222 can write the N segmentation mask in the storage device(s) 214.

At block 704, the example scaling circuitry 224 (FIG. 2) reads the N segmentation mask from the storage device(s) 214. Additionally, the example scaling circuitry 224 can read the N−1 segmentation mask from the storage device(s) 214 generated and stored by the AI engine circuitry 222 at a previous iteration. At block 706, the example scaling circuitry 224 scales the segmentation masks (e.g., the N segmentation mask and/or the N−1 segmentation mask). For example, the scaling circuitry 224 adjusts the resolution of the segmentation mask(s) such that it is the same as the resolution of the image generated by the camera 108. At block 708, the example TNR circuitry 226 (FIG. 2) reads an N foreground region (e.g., the N foreground region 408 of FIG. 4). For example, the TNR circuitry 226 receives the scaled segmentation masks (e.g., the N segmentation mask, the N−1 segmentation mask, etc.) from the scaling circuitry 224. The example TNR circuitry 226 uses data from the N segmentation mask to read a portion of the N frame from the storage device(s) 214 corresponding to the foreground region of the N frame. Thus, the example TNR circuitry 226 obtains the N foreground region.

At block 710, the example TNR circuitry 226 determines a changed region mask. For example, the TNR circuitry 226 calculates a union of the foreground region of the N segmentation mask and a foreground region of the N−1 segmentation mask. At block 712, the example TNR circuitry 226 reads a changed region (e.g., the changed region 412) from the storage device(s) 214. For example, the TNR circuitry 226 can read a portion of an N−1 video frame in the storage device(s) 214 corresponding to the changed region mask. At block 714, the example TNR circuitry 226 applies temporal noise reduction on the N foreground region using the changed region as reference. As a result, the example TNR circuitry 226 generates a processed N foreground region (e.g., the processed N foreground region 416).

At block 716, the example selection circuitry 228 (FIG. 2) determines an uncovered background region mask. First, the example selection circuitry 228 receives the scaled segmentation masks (e.g., the scaled N segmentation mask and the scaled N−1 segmentation mask) from the TNR circuitry 226. In other examples, the selection circuitry 228 can receive the scaled segmentation masks directly from the scaling circuitry 224. Next, the example selection circuitry 228 subtracts the foreground region of the N segmentation mask from the foreground region of the N−1 segmentation mask to determine the uncovered background region mask. As explained above, the uncovered background region mask corresponds to a portion of a background image that was covered by the foreground region of the N−1 video frame but is uncovered due to movement of the foreground region of the N video frame.

At block 718, the example selection circuitry 228 reads an uncovered background region (e.g., the uncovered background region 418) from the storage device(s) 214. For example, the selection circuitry 228 can select a portion of a background image (e.g., the background image 402) corresponding to the uncovered background region mask.

At block 720, the encoder circuitry 230 encodes an updated frame portion. For example, the encoder circuitry 230 receives the uncovered background region from the example selection circuitry 228 and receives the processed N foreground region from the TNR circuitry 226 and/or the selection circuitry 228. The example encoder circuitry 230 also receives the changed region from the TNR circuitry 226 for use as referencing during the encoding process. The example encoder circuitry 230 encodes the processed N foreground region (e.g., the processed N foreground region 416) and the uncovered background region (e.g., the uncovered background region 418) in the updated frame portion at block 720 using, for example, a coding format such as H.264. In the example of FIG. 7, the portion of the background image not depicting the N foreground region or the uncovered background region is not encoded. Thus, a memory access efficiency is improved by reducing memory accesses for only coding blocks of the updated frame portion.

After encoding the updated frame portion, the example encoder circuitry 230 writes the updated frame portion to the storage device(s) 214 at block 722. Control continues to block 606 where, as described above, the example encoder circuitry 230 transmits the video frame with the replaced background to one or more other user devices (e.g., the video conferencing output device(s) 232). At block 608, the example camera 108 detects if an additional video frame is ready for processing. If an additional video frame is ready for processing (block 608: YES), control returns to block 702 to replace the background of the additional video frame. If an additional video frame is not ready for processing (block 608: NO), the example instructions of FIG. 7 end.

Figure 8:
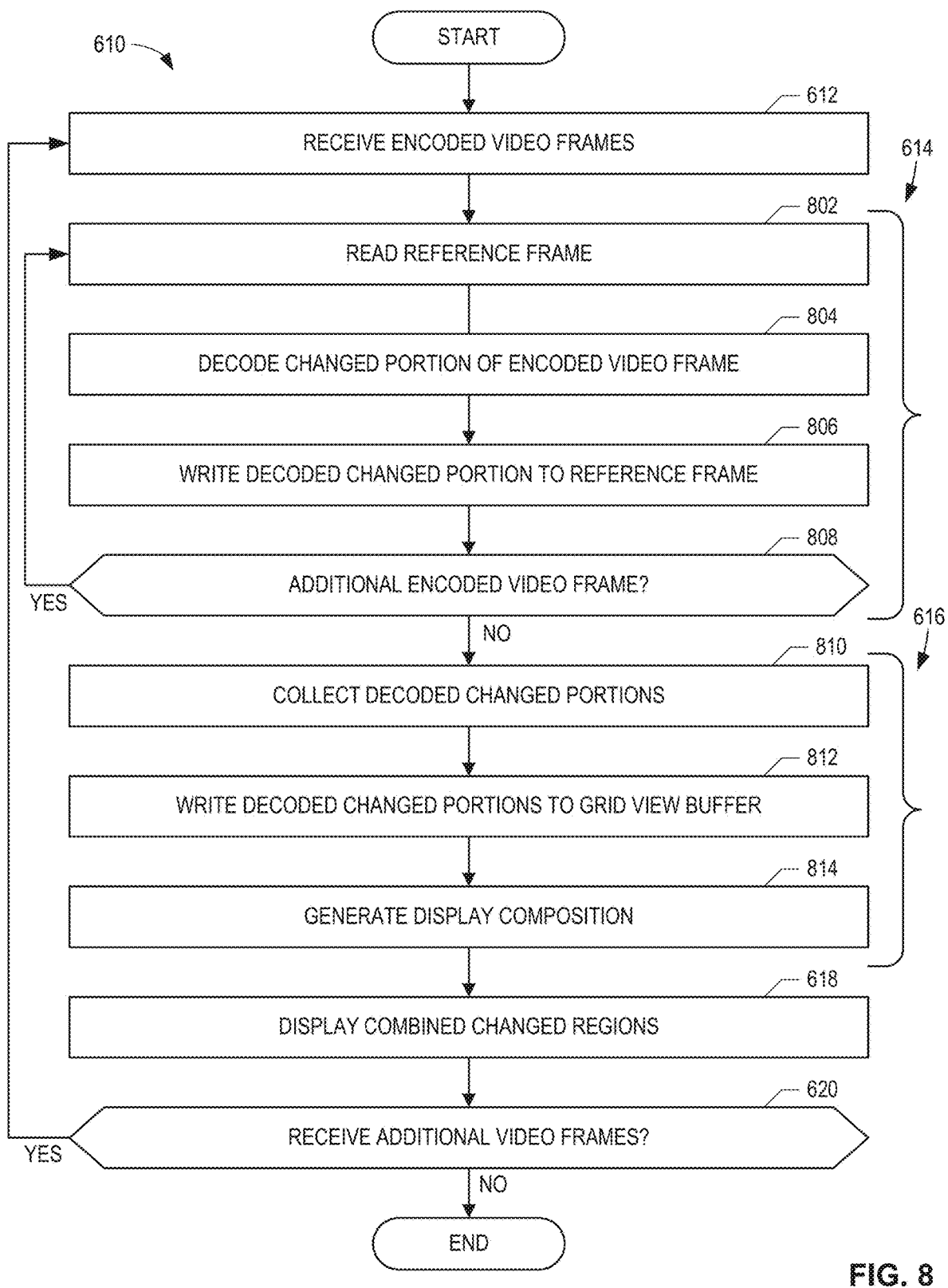

FIG. 8 is a more detailed flowchart representative of the example machine readable instructions and/or example operations 610 of FIG. 6B that may be executed and/or instantiated by processor circuitry to decode video frames during operation of a video conferencing application. The machine readable instructions and/or operations 610 of FIG. 8 begin at block 612, at which the local user device 102 (FIG. 1) receives one or more encoded video frames at the buffer storage 500 (FIG. 5A) from one or more user devices (e.g., the remote user device 106a, the remote user device 106b, the remote user device 106n, etc. of FIG. 1). Example machine readable instructions of blocks 802 to 808 may be used to implement block 614 (decode video frames) of FIG. 6B. At block 802, the example decoder circuitry 234 (FIG. 2) reads a reference frame (e.g., the reference frame 504a of FIG. 5) from the storage device(s) 214 (FIG. 2) corresponding to a video frame decoded at a previous time step. At block 804, the example decoder circuitry 234 decodes a changed portion of an encoded video frame. For example, the decoder circuitry 234 uses the decode process illustrated in FIG. 5B to decode the video frame using the reference frame as a reference. In the example of FIG. 8, the decoder circuitry 234 skips decoding on static or unchanged portions of the encoded video frame such that only the changed portion(s) of the video frame is/are decoded. Thus, the output of the decoding is a decoded changed portion of the video frame. At block 806, the example decoder circuitry 234 writes the changed portion to the reference frame on the storage device(s) 214. For example, the decoder circuitry 234 updates a portion of the reference frame with the changed portion, thus updating the reference frame to the current iteration.

At block 808, the decoder circuitry 234 detects if an additional encoded video frame is available in the buffer storage from an additional user device for the current time step. If an additional encoded video frame is available (block 808: YES), control returns to block 802 to decode the additional encoded video frame. If an additional encoded video frame is not available (block 808: NO), control continues to block 810. Example machine readable instructions of blocks 810 to 814 may be used to implement block 616 (combine changed portions) of FIG. 6B. At block 810, the example combiner circuitry 236 (FIG. 2) collects the decoded changed portions. For example, the example SFC circuitry 235 (FIG. 2) receives the changed portions directly from the decoder circuitry 234. The example SFC circuitry 235 transfers each of the changed portions from the decoder circuitry 234 to the combiner circuitry 236 without writing and/or reading data including the changed portions to and/or from the memory (e.g., the storage device(s) 214) of the user device. At block 812, the example combiner circuitry 236 (FIG. 2) writes the decoded changed portions to the storage device(s) 214 into a grid view buffer. In the example of FIG. 8, the combiner circuitry 236 includes metadata in the grid view buffer to indicate the changed portions of the images. At block 814, the example display controller circuitry 238 (FIG. 2) generates a display composition (e.g., the display composition 512). The example display controller circuitry 238 generates the display composition 512 by combining the grid view buffer 510 with the user interface components of the video conferencing application 212. At block 618, the example display controller circuitry 238 displays the decoded changed regions. For example, the display controller circuitry 238 updates the display screen 202 with the display composition 512. In the example of FIG. 8, the display controller circuitry 238 selectively updates the display screen 202 with the changed regions. For example, the display controller circuitry 238 uses the metadata included in the display composition 512 to determine the changed regions of the display composition 512. At block 620, the example decoder circuitry 234 detects if additional video frames are received and available in the buffer storage 500. If additional video frames are received (block 620: YES), control returns to block 802 to decode the additional video frames. If additional video frames are not received (block 620: NO), the example instructions of FIG. 8 end.

Figure 9:
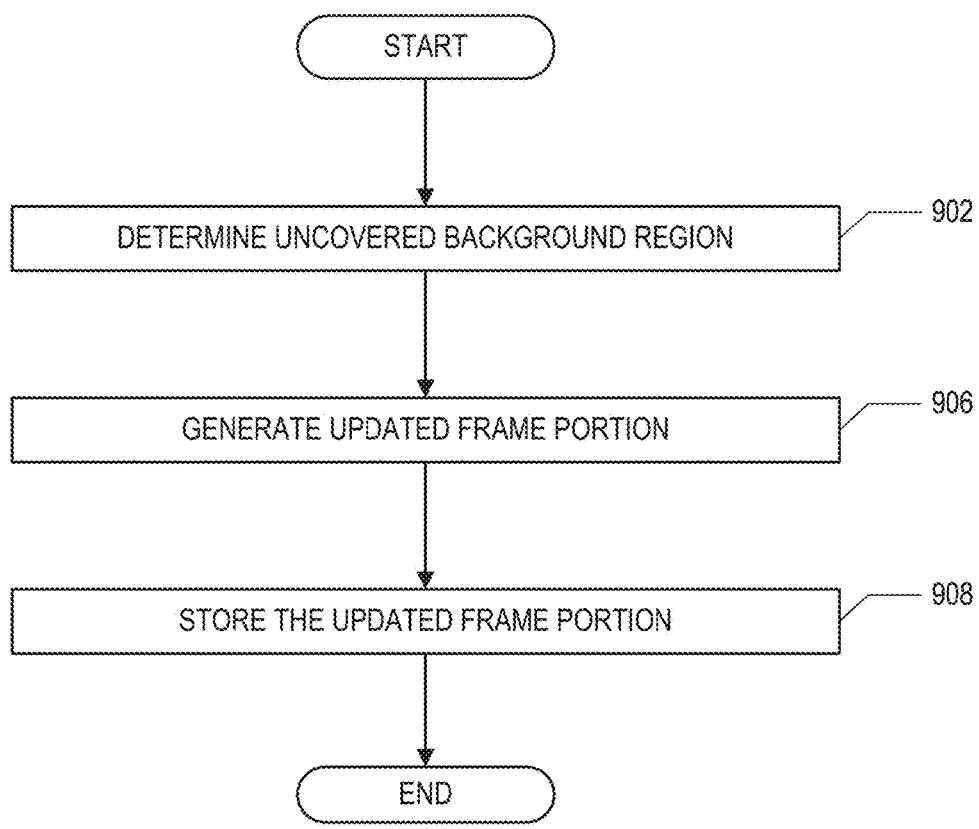

FIG. 9 is a flowchart representative of example machine readable instructions and/or example operations 900 that may be executed and/or instantiated by processor circuitry to encode video frames during operation of a video conferencing application. The machine readable instructions and/or operations 900 of FIG. 9 begin at block 902, at which the example selection circuitry 228 (FIG. 2) determines an uncovered background region. For example, the selection circuitry 228 can determine an uncovered background region mask and subsequently read the uncovered background region of a background image. At block 906, the example encoder circuitry 230 (FIG. 2) generates an updated frame portion. For example, the encoder circuitry 230 can generate the updated frame portion by encoding the uncovered background region along with a foreground region of a video frame. At block 908, the example encoder circuitry 230 stores the updated frame portion to a memory. For example, the encoder circuitry 230 can write the coding blocks of the uncovered background region to a video frame stored in a memory of a user device to update the video frame with the uncovered background region. The example instructions of FIG. 9 ends.

Figure 10:
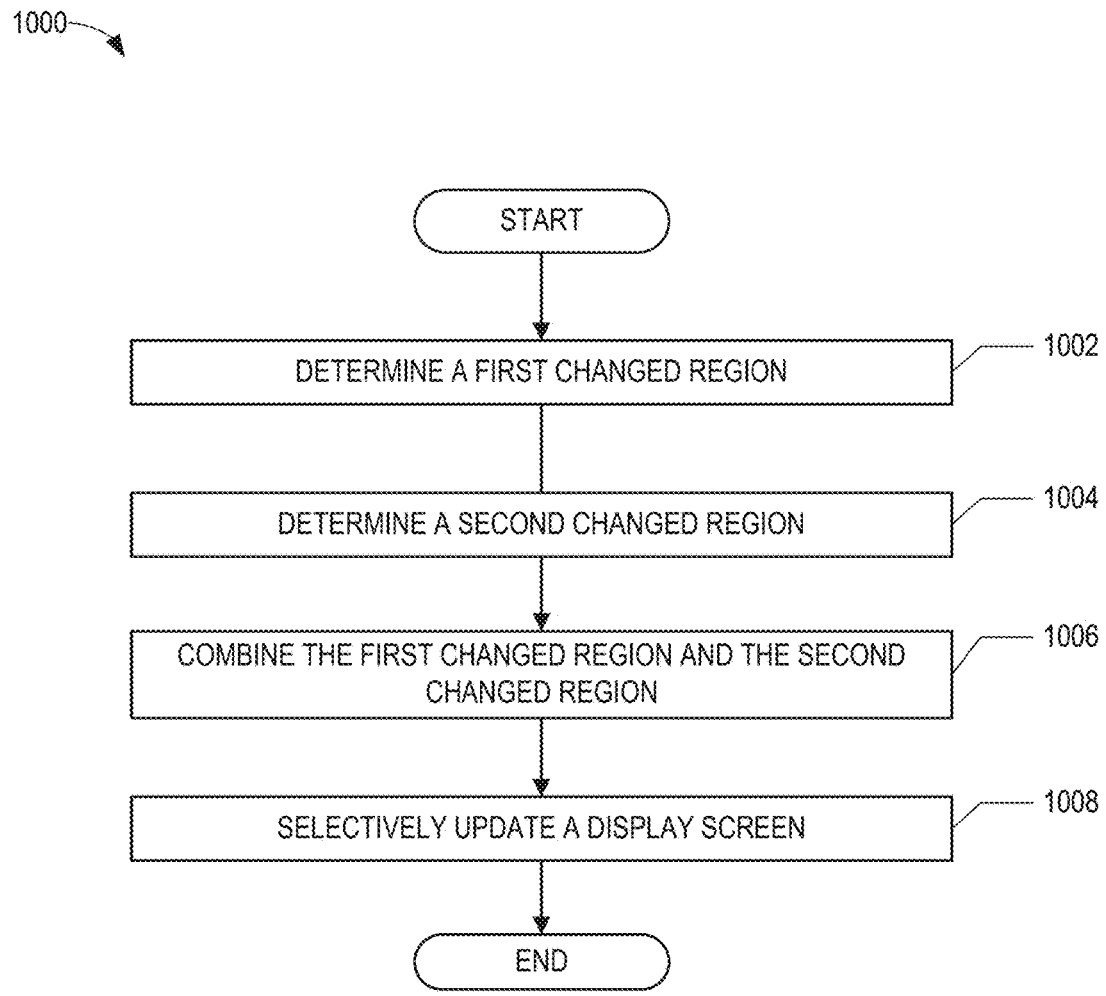

FIG. 10 is a flowchart representative of example machine readable instructions and/or example operations 1000 that may be executed and/or instantiated by processor circuitry to decode video frames during operation of a video conferencing application. The machine readable instructions and/or operations 1000 of FIG. 10 begin at block 1002, at which the example decoder circuitry 234 (FIG. 2) determines a first changed region of a first encoded video frame. At block 1004, the example decoder circuitry 234 determines a second changed region of a second encoded video frame. At block 1006, the example combiner circuitry 236 combines the first changed region and the second changed region. For example, the combiner circuitry 236 (FIG. 2) can combine the first changed region and the second changed region by writing the changed regions to a grid view buffer in a memory of a user device. At block 1008, the example display controller circuitry 238 (FIG. 2) selectively updates a display screen with the first changed region and the second changed region. The example instructions of FIG. 10 end.

Figure 11:
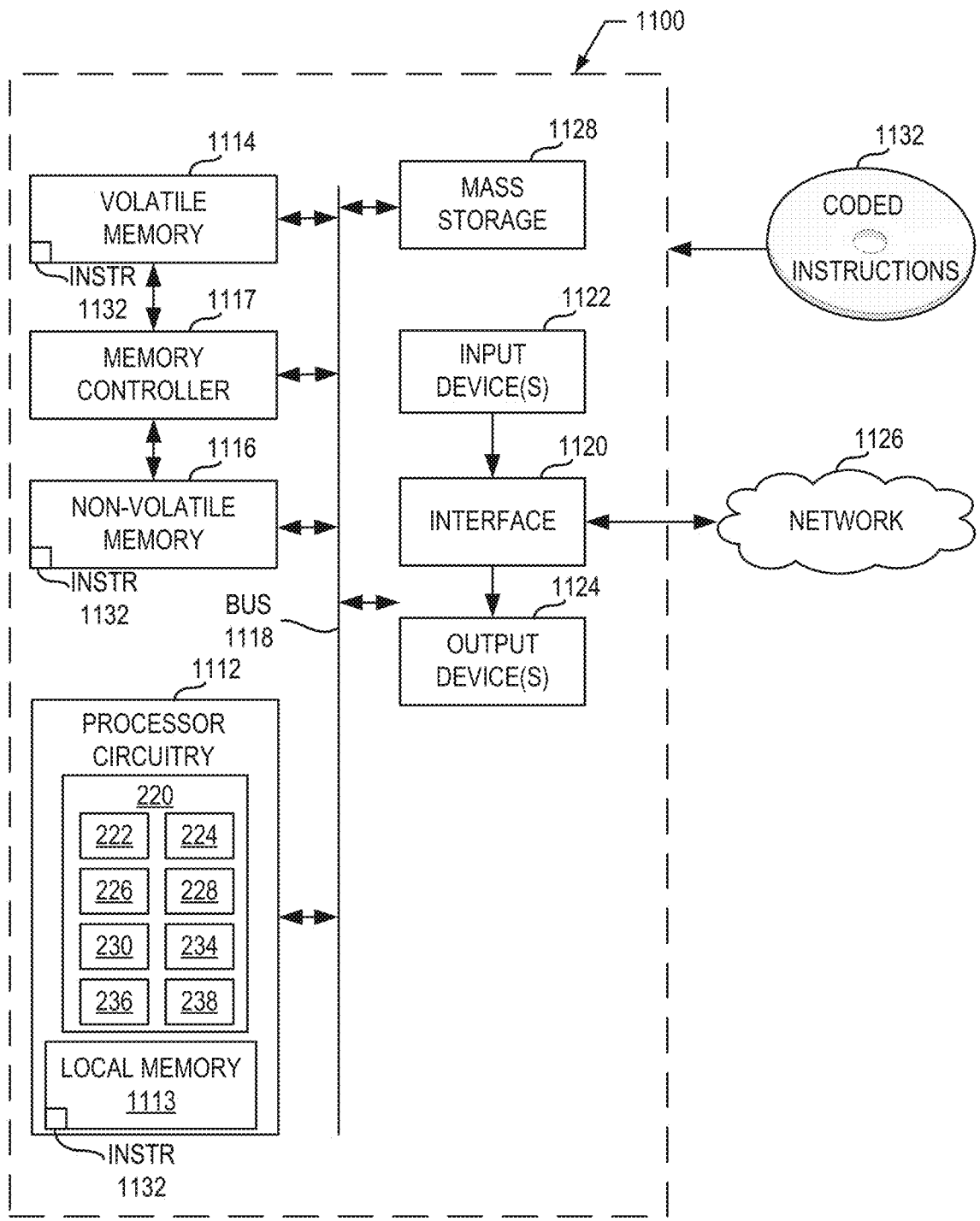
FIG. 11 is a block diagram of an example processing platform including processor circuitry structured to execute the example machine readable instructions of FIGS. 6-10 to implement the image processing circuitry of FIGS. 2, 4, and/or 5.

FIG. 11 is a block diagram of an example processor platform 1100 structured to execute and/or instantiate the machine readable instructions and/or operations of FIGS. 6-10 to implement the image processing circuitry 220 of FIG. 2. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs micropro- cessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 112 implements the image processing circuitry 220, the AI engine circuitry 222, the scaling circuitry 224, the TNR circuitry 226, the selection circuitry 228, the encoder circuitry 230, the decoder circuitry 234, the combiner circuitry 236, and the display controller circuitry 238.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

Example machine executable instructions 1132, which may be implemented by the machine readable instructions of FIGS. 6-10, may be stored in the mass storage device 1128, in the volatile memory 1114, in the non-volatile memory 1116, and/or on a removable non-transitory computer readable storage medium such as a CD or DVD.

Figure 12:
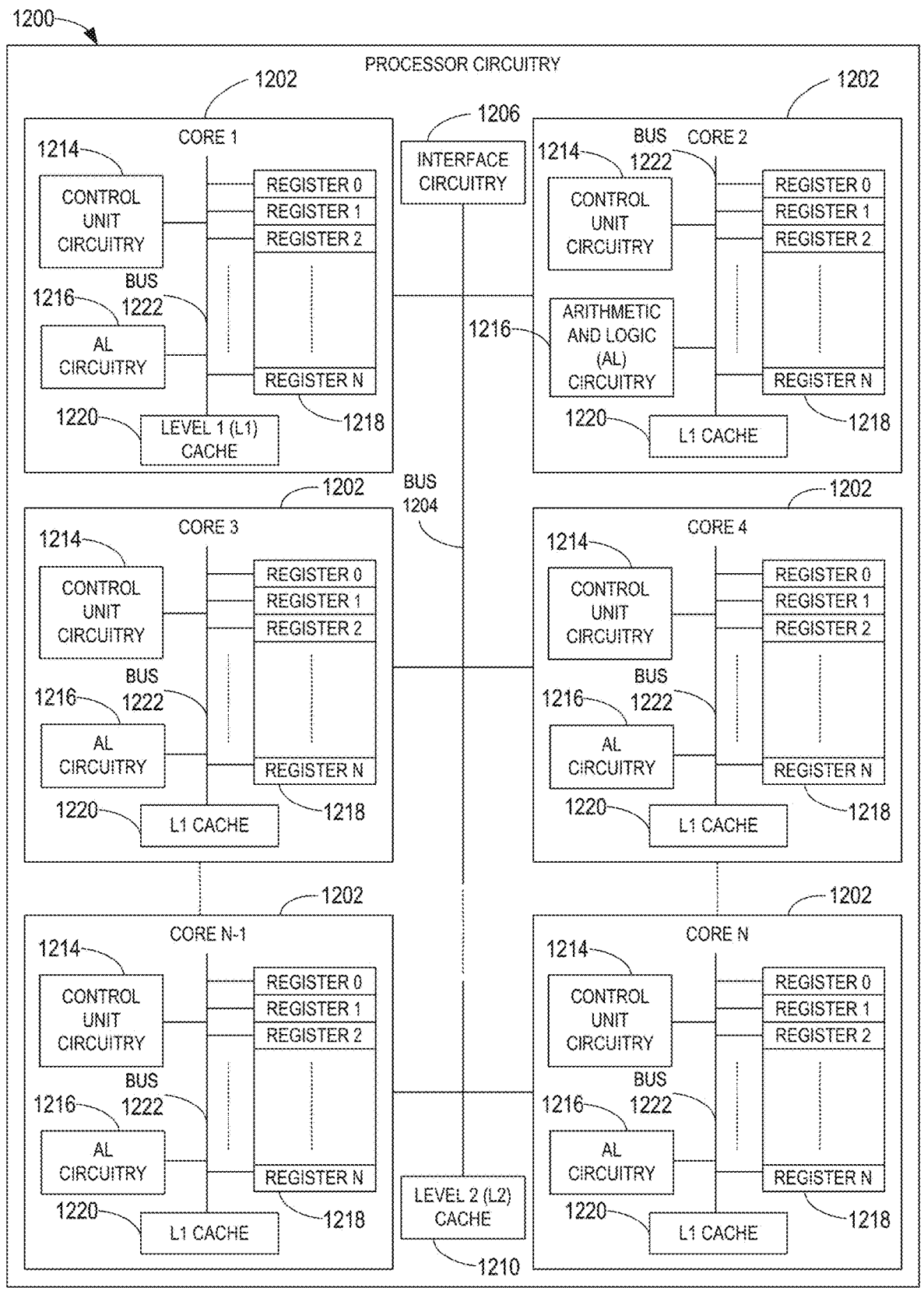
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 6-10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
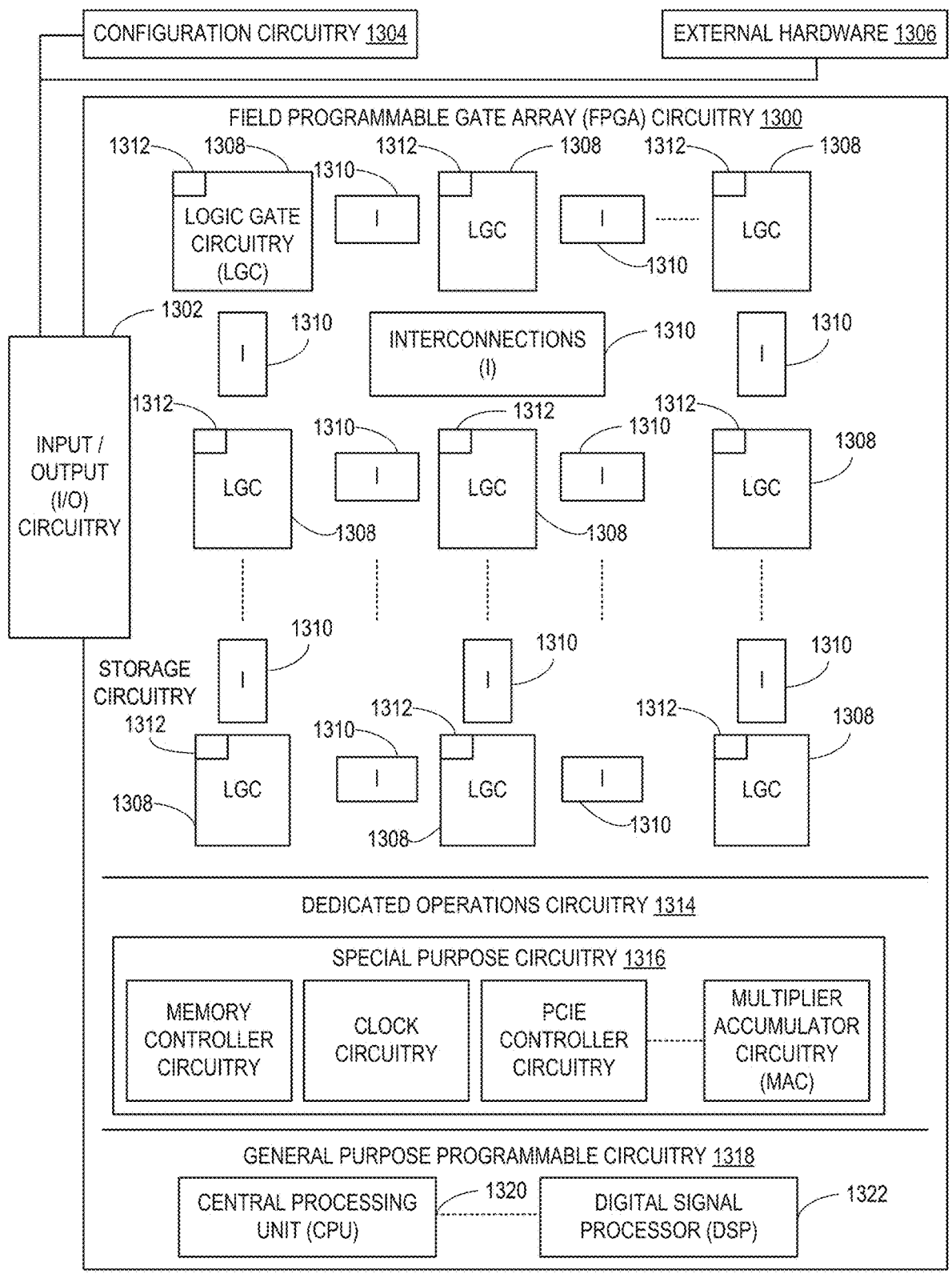
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 6-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 6-10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 6-10. As such, the FPGA circuitry 1300 may be structured to effectively instantiate some or all of the machine readable instructions of the flowcharts of FIGS. 6-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 6-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 6-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 6-10 may be executed by one or more of the cores 1202 of FIG. 12 and a second portion of the machine readable instructions represented by the flowcharts of FIGS. 6-10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
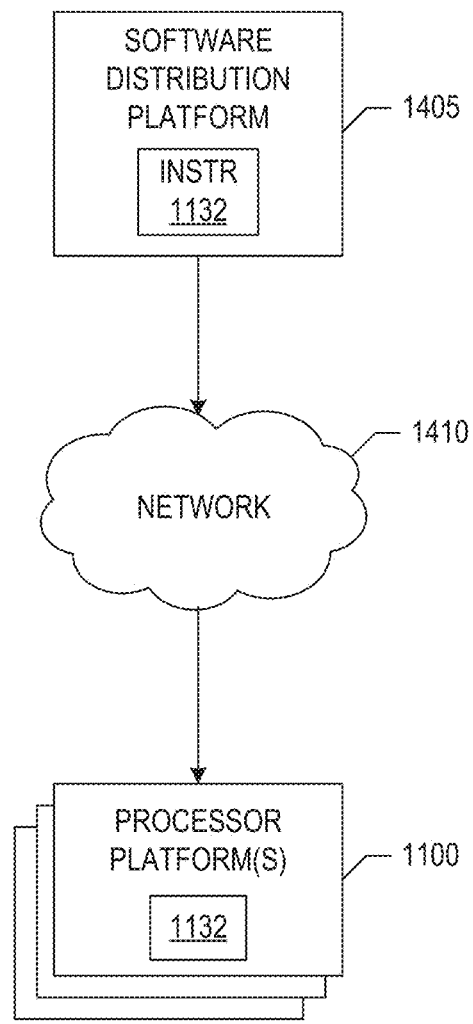
FIG. 14 is a block diagram of an example software distribution platform (e.g., one or more servers) to distribute software (e.g., software corresponding to the example machine readable instructions of FIGS. 6-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 600, 610, 900, 1000 of FIGS. 6-10, as described above. The one or more servers of the example software distribution platform 1405 are in communication with a network 1410, which may correspond to any one or more of the Internet and/or any of the example networks 104 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 600, 610, 900, 1000 of FIGS. 6-10, may be downloaded to the example processor platform 1100, which is to execute the machine readable instructions 1132 to implement the image processing circuitry 220. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that reduce memory bandwidth usage for video collaboration and other media use cases. By reducing memory accesses resulting in reduced memory bandwidth usage, example disclosed systems, methods, apparatus, and articles of manufacture improve the efficiency of using a computing device by reducing computing device power consumption during image processing operations such as during video conferencing and increasing memory bandwidth available to other operations. The disclosed systems, methods, apparatus, and articles of manufacture are accordingly directed to one or more improvement(s) in the operation of a machine such as a computer or other electronic and/or mechanical device.

Example apparatus, systems, and methods for performing dirty region reads and writes to reduce memory bandwidth usage are disclosed herein. Further examples and combinations thereof include the following:

Example 1 includes an apparatus including at least one memory; instructions in the apparatus; and processor circuitry to execute the instructions to determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame; generate an updated frame portion by encoding the second foreground region and dirty blocks of the background image corresponding to the uncovered region without encoding static blocks of the background image, the static blocks not corresponding to the uncovered region; and store the updated frame portion in the at least one memory.

Example 2 includes the apparatus of example 1, wherein the processor circuitry is to execute the instructions to perform noise reduction on the second foreground region.

Example 3 includes the apparatus of example 2, wherein the noise reduction is temporal noise reduction.

Example 4 includes the apparatus of example 1, wherein the background image is a previous video frame with a blur effect applied.

Example 5 includes the apparatus of example 1, wherein the processor circuitry is to execute the instructions to determine the first foreground region and the second foreground region using a segmentation mask.

Example 6 includes the apparatus of example 1, wherein the processor circuitry is to execute the instructions to determine the uncovered region of the background image based on a difference of the first foreground region and the second foreground region.

Example 7 includes the apparatus of example 1, wherein the processor circuitry is to execute the instructions to include metadata corresponding to the updated frame portion during the encoding.

Example 8 includes an apparatus including image processing circuitry to determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame; and encoder circuitry to generate an updated frame portion by encoding the second foreground region and dirty blocks of the background image corresponding to the uncovered region without encoding static blocks of the background image, the static blocks not corresponding to the uncovered region; and store the updated frame portion in at least one memory.

Example 9 includes the apparatus of example 8, wherein the image processing circuitry is to perform noise reduction on the second foreground region.

Example 10 includes the apparatus of example 9, wherein the noise reduction is temporal noise reduction.

Example 11 includes the apparatus of example 8, wherein the background image is a previous video frame with a blur effect applied.

Example 12 includes the apparatus of example 8, wherein the image processing circuitry is to determine the first foreground region and the second foreground region using a segmentation mask.

Example 13 includes the apparatus of example 8, wherein the image processing circuitry is to determine the uncovered region of the background image based on a difference of the first foreground region and the second foreground region.

Example 14 includes the apparatus of example 8, wherein the encoding circuitry is to include metadata corresponding to the updated frame portion during the encoding.

Example 15 includes at least one non-transitory computer readable storage medium comprising instructions that, when executed, cause processor circuitry to at least determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame; generate an updated frame portion by encoding the second foreground region and dirty blocks of the background image corresponding to the uncovered region without encoding static blocks of the background image, the static blocks not corresponding to the uncovered region; and store the updated frame portion in at least one memory.

Example 16 includes the at least one non-transitory computer readable storage medium of example 15, wherein the instructions, when executed, cause the processor circuitry to perform noise reduction on the second foreground region.

Example 17 includes the at least one non-transitory computer readable storage medium of example 16, wherein the noise reduction is temporal noise reduction.

Example 18 includes the at least one non-transitory computer readable storage medium of example 15, wherein the background image is a previous video frame with a blur effect applied.

Example 19 includes the at least one non-transitory computer readable storage medium of example 15, wherein the instructions, when executed, cause the processor circuitry to determine the first foreground region and the second foreground region using a segmentation mask.

Example 20 includes the at least one non-transitory computer readable storage medium of example 15, wherein the instructions, when executed, cause the processor circuitry to determine the uncovered region of the background image based on a difference of the first foreground region and the second foreground region.

Example 21 includes the at least one non-transitory computer readable storage medium of example 15, wherein the instructions, when executed, cause the processor circuitry to include metadata corresponding to the updated frame portion during the encoding.

Example 22 includes a method including determining an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame; generating an updated frame portion by encoding the second foreground region and dirty blocks of the background image corresponding to the uncovered region without encoding static blocks of the background image, the static blocks not corresponding to the uncovered region; and storing the updated frame portion in at least one memory.

Example 23 includes the method of example 22, further including performing noise reduction on the second foreground region.

Example 24 includes the method of example 23, wherein the noise reduction is temporal noise reduction.

Example 25 includes the method of example 22, wherein the background image is a previous video frame with a blur effect applied.

Example 26 includes the method of example 22, further including determining the first foreground region and the second foreground region using a segmentation mask.

Example 27 includes the method of example 22, further including determining the uncovered region of the background image based on a difference of the first foreground region and the second foreground region.

Example 28 includes the method of example 22, further including including metadata corresponding to the updated frame portion during the encoding.

Example 29 includes an apparatus including at least one memory; instructions in the apparatus; and processor circuitry to execute the instructions to generate a first changed region of a first current video frame by decoding a portion of the first current video frame corresponding to dirty blocks of the first current video frame; generate a second changed region of a second current video frame by decoding a portion of the second current video frame corresponding to dirty blocks of the second current video frame; combine the first changed region and the second changed region into a user interface grid view, the user interface grid view to include metadata indicating a portion of the user interface grid view including the first changed region and the second changed region; and selectively update a display screen with the first changed region and the second changed region.

Example 30 includes the apparatus of example 29, wherein the processor circuitry is to execute the instructions to determine the dirty blocks of the first current video frame and the dirty blocks of the second current video frame based on motion vectors and skip blocks.

Example 31 includes the apparatus of example 29, wherein the processor circuitry is to execute the instructions to decode the portion of the first current video frame corresponding to dirty blocks of the first current video frame using a first previous video frame as a reference and to decode the portion of the second current video frame corresponding to dirty blocks of the second current video frame using a second previous video frame as a reference.

Example 32 includes the apparatus of example 31, wherein the processor circuitry is to execute the instructions to write, to the at least one memory, the first changed region to the first previous video frame and the second changed region to the second previous video frame.

Example 33 includes the apparatus of example 29, wherein the user interface grid view includes metadata corresponding to the first changed region and the second changed region.

Example 34 includes the apparatus of example 33, wherein the metadata includes motion vectors and skip blocks.

Example 35 includes the apparatus of example 33, wherein the processor circuitry is to execute the instructions to selectively update the display screen based on the metadata.

Example 36 includes an apparatus including decoder circuitry to generate a first changed region of a first current video frame by decoding a portion of the first current video frame corresponding to dirty blocks of the first current video frame; and generate a second changed region of a second current video frame by decoding a portion of the second current video frame corresponding to dirty blocks of the second current video frame; combiner circuitry to combine the first changed region and the second changed region into a user interface grid view, the user interface grid view to include metadata indicating a portion of the user interface grid view including the first changed region and the second changed region; and display controller circuitry to selectively update a display screen with the first changed region and the second changed region.

Example 37 includes the apparatus of example 36, wherein the decoder circuitry is to determine the dirty blocks of the first current video frame and the dirty blocks of the second current video frame based on motion vectors and skip blocks.

Example 38 includes the apparatus of example 36, wherein the decoder circuitry is to decode the portion of the first current video frame corresponding to dirty blocks of the first current video frame using a first previous video frame as a reference and to decode the portion of the second current video frame corresponding to dirty blocks of the second current video frame using a second previous video frame as a reference.

Example 39 includes the apparatus of example 38, wherein the decoder circuitry is to write, to at least one memory, the first changed region to the first previous video frame and the second changed region to the second previous video frame.

Example 40 includes the apparatus of example 36, wherein the user interface grid view includes metadata corresponding to the first changed region and the second changed region.

Example 41 includes the apparatus of example 40, wherein the metadata includes motion vectors and skip blocks.

Example 42 includes the apparatus of example 40, wherein the display controller circuitry is to selectively update the display screen based on the metadata.

Example 43 includes at least one non-transitory computer readable storage medium comprising instructions that, when executed, cause processor circuitry to at least generate a first changed region of a first current video frame by decoding a portion of the first current video frame corresponding to dirty blocks of the first current video frame; generate a second changed region of a second current video frame by decoding a portion of the second current video frame corresponding to dirty blocks of the second current video frame; combine the first changed region and the second changed region into a user interface grid view, the user interface grid view to include metadata indicating a portion of the user interface grid view including the first changed region and the second changed region; and selectively update a display screen with the first changed region and the second changed region.

Example 44 includes the at least one non-transitory computer readable storage medium of example 43, wherein the instructions, when executed, cause the processor circuitry to determine the dirty blocks of the first current video frame and the dirty blocks of the second current video frame based on motion vectors and skip blocks.

Example 45 includes the at least one non-transitory computer readable storage medium of example 43, wherein the instructions, when executed, cause the processor circuitry to decode the portion of the first current video frame corresponding to dirty blocks of the first current video frame using a first previous video frame as a reference and to decode the portion of the second current video frame corresponding to dirty blocks of the second current video frame using a second previous video frame as a reference.

Example 46 includes the at least one non-transitory computer readable storage medium of example 45, wherein the instructions, when executed, cause the processor circuitry to write, to at least one memory, the first changed region to the first previous video frame and the second changed region to the second previous video frame.

Example 47 includes the at least one non-transitory computer readable storage medium of example 43, wherein the user interface grid view includes metadata corresponding to the first changed region and the second changed region.

Example 48 includes the at least one non-transitory computer readable storage medium of example 47, wherein the metadata includes motion vectors and skip blocks.

Example 49 includes the at least one non-transitory computer readable storage medium of example 47, wherein the instructions, when executed, cause the processor circuitry to selectively update the display screen based on the metadata.

Example 50 includes a method including generating a first changed region of a first current video frame by decoding a portion of the first current video frame corresponding to dirty blocks of the first current video frame; generating a second changed region of a second current video frame by decoding a portion of the second current video frame corresponding to dirty blocks of the second current video frame; combing the first changed region and the second changed region into a user interface grid view, the user interface grid view to include metadata indicating a portion of the user interface grid view including the first changed region and the second changed region; and selectively updating a display screen with the first changed region and the second changed region.

Example 51 includes the method of example 50, further including determining the dirty blocks of the first current video frame and the dirty blocks of the second current video frame based on motion vectors and skip blocks.

Example 52 includes the method of example 50, further including decoding the portion of the first current video frame corresponding to dirty blocks of the first current video frame using a first previous video frame as a reference and to decode the portion of the second current video frame corresponding to dirty blocks of the second current video frame using a second previous video frame as a reference.

Example 53 includes the method of example 52, further including writing, to at least one memory, the first changed region to the first previous video frame and the second changed region to the second previous video frame.

Example 54 includes the method of example 50, wherein the user interface grid view includes metadata corresponding to the first changed region and the second changed region.

Example 55 includes the method of example 54, wherein the metadata includes motion vectors and skip blocks.

Example 56 includes the method of example 54, further including selectively updating the display screen based on the metadata.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   processor circuitry to execute the instructions to:
   determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame;
   generate an updated frame portion by encoding the second foreground region and dirty blocks of the background image corresponding to the uncovered region without encoding static blocks of the background image, the static blocks not corresponding to the uncovered region; and
   store the updated frame portion in the at least one memory.

2. The apparatus of claim 1, wherein the processor circuitry is to execute the instructions to perform noise reduction on the second foreground region.

3. The apparatus of claim 2, wherein the noise reduction is temporal noise reduction.

4. The apparatus of claim 1, wherein the background image is at least one of the previous video frame or a second previous video frame with a blur effect applied.

5. The apparatus of claim 1, wherein the processor circuitry is to execute the instructions to determine the first foreground region and the second foreground region using a segmentation mask.

6. The apparatus of claim 1, wherein the processor circuitry is to execute the instructions to determine the uncovered region of the background image based on a difference of the first foreground region and the second foreground region.

7. The apparatus of claim 1, wherein the processor circuitry is to execute the instructions to include metadata corresponding to the updated frame portion during the encoding.

8. At least one non-transitory computer readable storage medium comprising instructions that, when executed, cause processor circuitry to at least:
   determine an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame;
   generate an updated frame portion by encoding the second foreground region and dirty blocks of the background image corresponding to the uncovered region without encoding static blocks of the background image, the static blocks not corresponding to the uncovered region; and
   store the updated frame portion in at least one memory.

9. The at least one non-transitory computer readable storage medium of claim 8, wherein the instructions, when executed, cause the processor circuitry to perform noise reduction on the second foreground region.

10. The at least one non-transitory computer readable storage medium of claim 9, wherein the noise reduction is temporal noise reduction.

11. The at least one non-transitory computer readable storage medium of claim 8, wherein the background image is at least one of the previous video frame or a second previous video frame with a blur effect applied.

12. The at least one non-transitory computer readable storage medium of claim 8, wherein the instructions, when executed, cause the processor circuitry to determine the first foreground region and the second foreground region using a segmentation mask.

13. The at least one non-transitory computer readable storage medium of claim 8, wherein the instructions, when executed, cause the processor circuitry to determine the uncovered region of the background image based on a difference of the first foreground region and the second foreground region.

14. The at least one non-transitory computer readable storage medium of claim 8, wherein the instructions, when executed, cause the processor circuitry to include metadata corresponding to the updated frame portion during the encoding.

15. A method comprising:
determining an uncovered region of a background image in a current video frame relative to the background image in a previous video frame, the uncovered region obscured in the previous video frame by a first foreground region of the previous video frame, and the uncovered region uncovered in the current video frame based on movement of a second foreground region in the current video frame relative to the first foreground region of the previous video frame;
generating an updated frame portion by encoding the second foreground region and dirty blocks of the background image corresponding to the uncovered region without encoding static blocks of the background image, the static blocks not corresponding to the uncovered region; and
storing the updated frame portion in at least one memory.

16. The method of claim 15, further including performing noise reduction on the second foreground region.

17. The method of claim 16, wherein the noise reduction is temporal noise reduction.

18. The method of claim 15, wherein the background image is at least one of the previous video frame or a second previous video frame with a blur effect applied.

19. The method of claim 15, further including determining the first foreground region and the second foreground region using a segmentation mask.

20. The method of claim 15, further including determining the uncovered region of the background image based on a difference of the first foreground region and the second foreground region.

21. The method of claim 15, further including metadata corresponding to the updated frame portion during the encoding.

* * * * *